US010176605B2

(12) United States Patent
Wigington et al.

(10) Patent No.: US 10,176,605 B2
(45) Date of Patent: Jan. 8, 2019

(54) DYNAMIC DISPLAY OF HEIRARCHAL DATA

(71) Applicant: BRIGHAM YOUNG UNIVERSITY, Provo, UT (US)

(72) Inventors: Curtis M. Wigington, Hales Corner, WI (US); William Arthur Barrett, Provo, UT (US)

(73) Assignee: Brigham Young University, Provo, UT (US)

(*) Notice: Subject to any disclaimer, the term of this patent is extended or adjusted under 35 U.S.C. 154(b) by 765 days.

(21) Appl. No.: 14/669,725

(22) Filed: Mar. 26, 2015

(65) Prior Publication Data

US 2015/0278273 A1 Oct. 1, 2015

Related U.S. Application Data

(60) Provisional application No. 61/970,574, filed on Mar. 26, 2014.

(51) Int. Cl.
*G06T 11/20* (2006.01)
*G06T 13/80* (2011.01)
*G06F 17/30* (2006.01)

(52) U.S. Cl.
CPC ...... *G06T 11/206* (2013.01); *G06F 17/30994* (2013.01); *G06T 13/80* (2013.01)

(58) Field of Classification Search
CPC .. G06F 17/30994; G06T 11/206; G06T 13/80
See application file for complete search history.

(56) References Cited

U.S. PATENT DOCUMENTS 5,333,254 A * 7/1994 Robertson ............. G06F 3/0481
707/E17.013
5,590,250 A * 12/1996 Lamping ............... G06T 11/206
345/427

(Continued)

FOREIGN PATENT DOCUMENTS

JP 2012-084058 A 4/2012

OTHER PUBLICATIONS

U. Dogrusoz et al., "A multi-graph approach to complexity management in interactive graph visualization", Computer & Graphics 30, 2006, pp. 86-97 (12 pages).

(Continued)

*Primary Examiner* — Justin R. Blaufeld
(74) *Attorney, Agent, or Firm* — Brake Hughes Bellermann LLP

(57) ABSTRACT

Systems and methods for dynamic display of hierarchical data (e.g., a tree) are provided. Dynamic display enables a user to navigate the hierarchical data by dragging, without having to select expand/contract icons. The systems and methods use a tree spacing structure to determine relative spacing of nodes based on a focus line and to automatically expand and collapse visual representations of nodes in the tree. Nodes on the focus line may be evenly spaced along the focus line, and all of the other nodes in the hierarchy not on the focus line may be positioned based on their relationship to nodes on the focus line, using the tree spacing structure. Ancestor nodes of nodes on the focus line may be positioned between their direct first and last child and children of focus level nodes may be positioned directly behind the focus level node.

19 Claims, 16 Drawing Sheets

(56) References Cited

U.S. PATENT DOCUMENTS

| | | |
|---|---|---|
| 5,812,135 A | 9/1998 | Kotchey |
| 5,943,679 A | 8/1999 | Niles et al. |
| 6,252,597 B1 | 6/2001 | Lokuge |
| 6,396,941 B1 | 5/2002 | Bacus et al. |
| 7,647,563 B2 | 1/2010 | Guido et al. |
| 7,788,599 B2 | 8/2010 | Michaud et al. |
| 8,185,557 B2 | 5/2012 | Slinker |
| 9,454,298 B2 | 9/2016 | Barrett et al. |
| 2002/0113816 A1* | 8/2002 | Mitchell ............... G06F 3/0481 715/734 |
| 2002/0118214 A1* | 8/2002 | Card ................. G06F 17/30873 345/619 |
| 2003/0007002 A1 | 1/2003 | Hida et al. |
| 2004/0165010 A1 | 8/2004 | Robertson et al. |
| 2004/0169688 A1 | 9/2004 | Burdick et al. |
| 2005/0149873 A1* | 7/2005 | Guido ................... G06F 3/0482 715/734 |
| 2014/0101602 A1 | 4/2014 | Barrett et al. |

OTHER PUBLICATIONS

Sarkar et al., "Graphical Fisheye Views of Graphs", CHI '92, Association for Computing Machinery, May 3-7, 1992, pp. 83-91 (9 pages).

\* cited by examiner

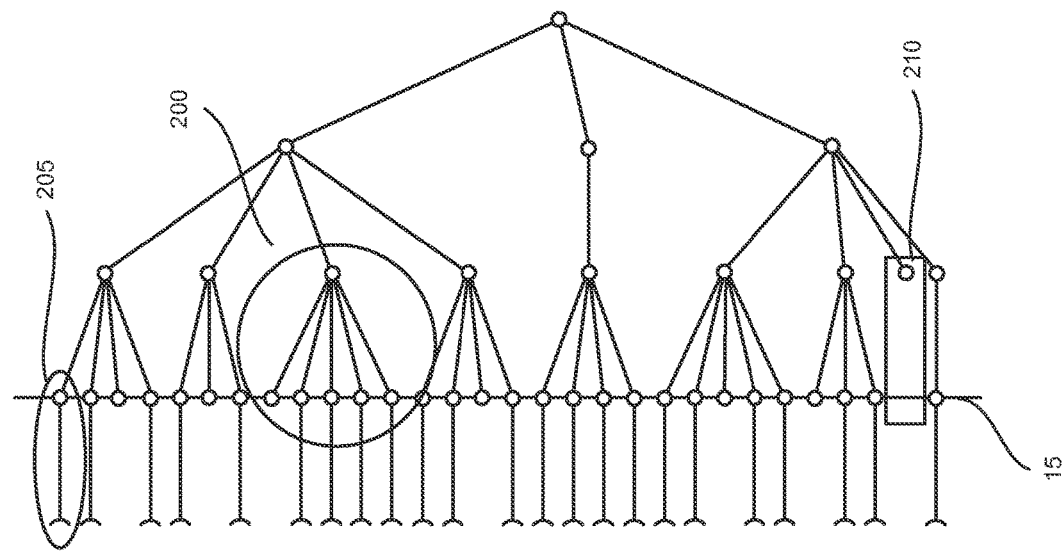
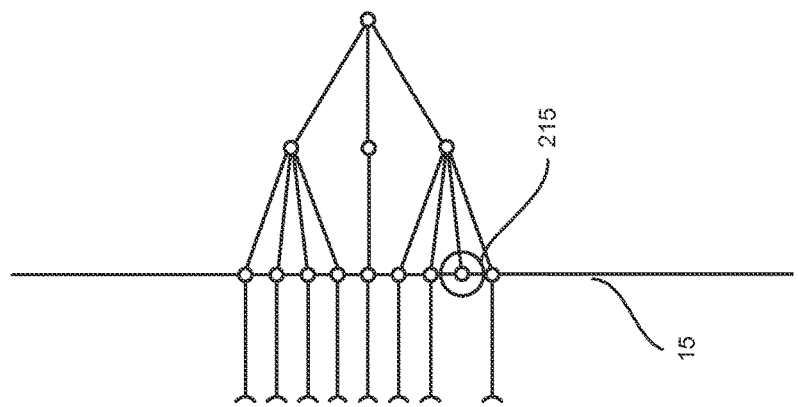
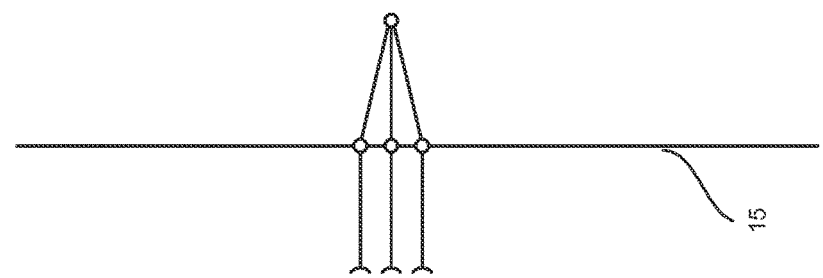
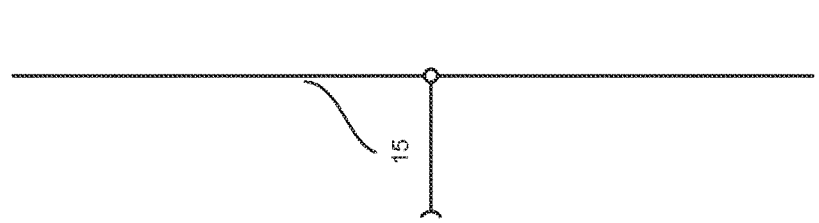

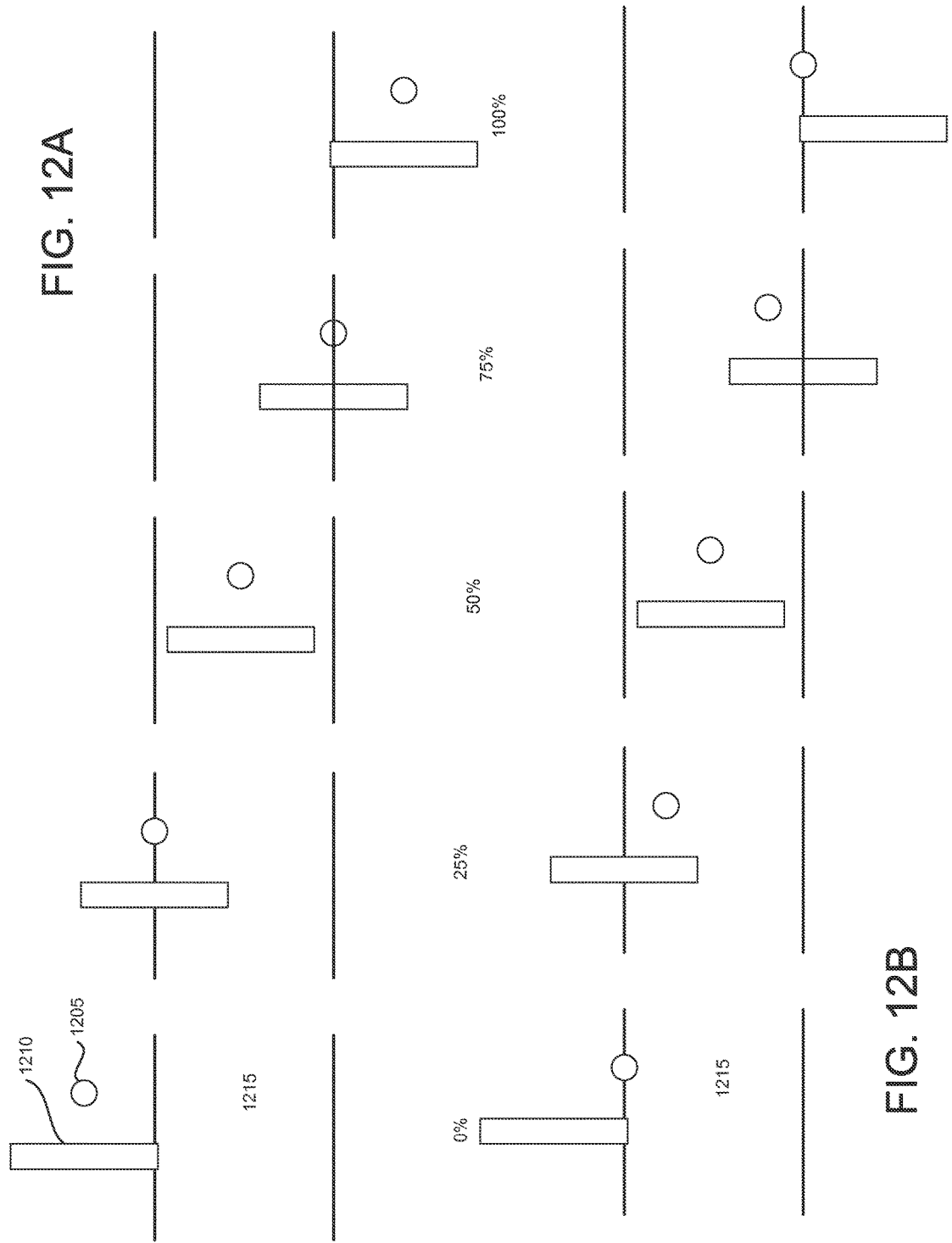

FIG. 16

DYNAMIC DISPLAY OF HEIRARCHAL DATA

RELATED APPLICATION

This application is a Non-Provisional of, and claims priority to, U.S. Provisional Application No. 61/970,574 entitled DYNAMIC DISPLAY OF HIERARCHAL DATA, filed on Mar. 26, 2014, which is incorporated by reference herein in its entirety

BACKGROUND

A user interface can be used to view data in a variety of ways. However, known user interfaces used for viewing data can be insufficient to view data and the relationships between elements of the data without losing context. For example, although known user interfaces can be used to view portions of hierarchical data using various functions such as zoom in, zoom out, expand/contract, etc., a user viewing the hierarchical data through these known user interfaces can lose the context of the data because of the size and complexity of the hierarchical data, especially when nodes can have zero to many children (e.g., unbalanced trees). Moreover, navigating a large tree via expand and contract controls can be cumbersome.

SUMMARY

According to one aspect, a system for displaying a hierarchical dataset includes a display device having a display area, the display area including a focus line and an upper bound and a lower bound orthogonal to the focus line, at least one processor, and memory. The memory stores a tree spacing structure for a branch in the hierarchical dataset, the branch having a root node and the tree spacing structure configured to include, for each node in the branch, an entry for each generation that includes the node, the entry specifying spacing of the node in a direction parallel to the focus line based on a quantity of descendants intersecting the focus line. The memory also stores instructions that, when executed by the at least one processor, cause the system to perform operations. The operations may include determining first coordinates on the display area for the root node, determining a generation for a descendant of the root node intersecting or approaching the focus line, determine second coordinates of at least some of the descendants in the display area using the tree spacing structure and the first coordinates of the root node, and trigger displaying, on the display device, a representation of the root node and representations of the at least some of the descendants in the display area using the first coordinates and the second coordinates.

In another aspect, a method of dynamically displaying representations of nodes in a hierarchy can include determining a target node for a select-and-drag operation, calculating first coordinates for the target node based on the select-and-drag operation, and determining second coordinates for direct ancestors of the target node up to a root node for the hierarchy using a tree spacing structure, the tree spacing structure configured to include, for each node in the hierarchy, an entry for each generation of the hierarchy that includes the node, the entry specifying spacing of the node in a direction parallel to a focus line with regard to space occupied by a child of the node. The method may also include starting with a root, recursively determining third coordinates of a child with a descendent in a display area of a display based on the tree spacing structure and triggering displaying on the display representations of the nodes having the first coordinates, the second coordinates, or the third coordinates in the display area.

In one general aspect, a non-transitory computer-readable storage medium can be configured to store instructions that when executed cause a processor to perform a process any of the methods or processes disclosed herein.

BRIEF DESCRIPTION OF THE DRAWINGS

FIGS. 2A to 2D are diagrams that illustrate a representation of spacing of a generation of a hierarchical dataset using a focus line, according to an implementation.

FIGS. 12A and 12B illustrate the effects of mapping a parent in the space parallel to the focus line occupied by the children in the display area, according to an implementation

FIG. 16 is an example of a user interface for changing the displayed root of a hierarchical dataset, according to an implementation.

DETAILED DESCRIPTION

Figure 1:
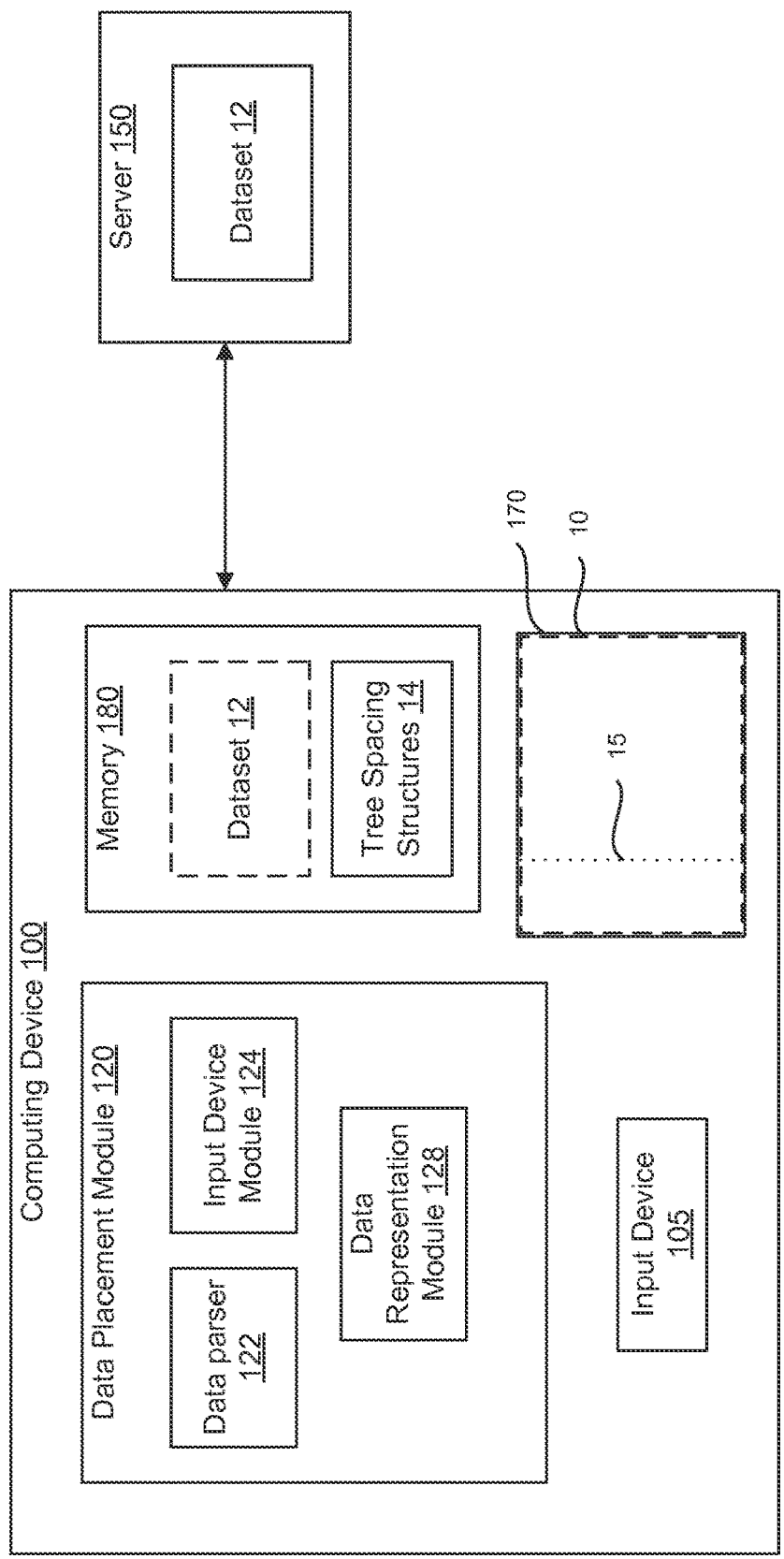
FIG. 1 is a diagram that illustrates a data placement module included in a computing device, according to an implementation.

A hierarchical dataset display system may use a tree spacing structure to dynamically display (e.g., display on a display device) nodes of a hierarchical dataset in a manner that preserves the context of the hierarchy or tree. A hierarchical dataset typically stores information about entities and how they are related to each other. An entity can be any person, place, or thing. Graphical depictions (e.g., on a display device) of the hierarchical dataset often illustrates the entities as an icon or as text and illustrates relations between entities via lines. For example, in a family history data set, lines linking a first node to a second node may represent a parent child relationship. In a directory dataset, the lines linking a first node to a second node may represent a "contains" or "includes" relationship. In an organizational dataset, the lines may indicate a supervisor/supervisee relationship etc. A root node is a node from which the system starts following relationships. For example, in an organizational dataset, the root may be the CEO. However, it is possible to select a different root, e.g., the Vice President of Research and only show the portion of the tree that ultimately reports to the Vice President of Research. Generations in a hierarchical dataset are defined by proximity to the root. If the root node is the first generation, any node linked directly to the root is the second generation. Any node linked to the root with a path length of two (e.g., linked directly to a node in the second generation) is the third generation.

In some implementations, the hierarchical display system may use a focus line to expand and contract visual representations of nodes in the hierarchical dataset as a user drags nodes around the display area (e.g., display area within a display device). The tree spacing structure may include values that enable the system to calculate relative spacing of nodes in a direction parallel to the focus line based on a number of factors, including placement of a focus node, proximity of a node to the focus line, the number of children also in the display (e.g., display of a display device), the size of the representations of the nodes etc. The system may dynamically display any kind of hierarchical data, including file structures, family history data (e.g., ancestors and descendants), computer system hierarchies, scientific classifications, etc. In some implementations, the system may include two focus lines, and maintain two tree spacing structure instances for the root node, one for ancestor data and one for descendent data.

The tree spacing structure may keep four spacing values for each node at each generation from the root. The root may be selected dynamically, meaning that the user can select one of the nodes in the hierarchical dataset as the root. This is especially helpful in very large hierarchical datasets as it allows a user to select a branch of the entire dataset and navigate within that branch. Because the spacing of nodes in a direction parallel to the focus line is not static, this allows the user to maintain context, but results in recalculation of the position of each node representation on the display (e.g., the display device) or entering the display as user performs a select-and-drag or zoom operation. The tree spacing structure entries speed the calculations, making the navigation experience smooth and intuitive for the user.

FIG. 1 is a diagram that illustrates a data placement module 120 included in a computing device 100. The data placement module 120 is configured to generate and use one or more tree spacing structures 14 to display one or more representations of portions of a branch of a dataset 12 displayed within a display area 10 of a display 170 (which can also be referred to as a display device). The dataset 12 may be a remote dataset, for example at server 150, that is accessible to computing device 100. For example, the computing device 100 may use an Internet, intra-net, or WAN connection to access dataset 12 at the server 150. In some implementations, a login may be required to access dataset 12 at the server 150. In some implementations, the dataset 12 may be local to the computing device 100, for example stored in memory 180.

The data placement module 120 may draw an initial representation of a portion of the dataset 12 and may redraw the representation in response to movement of the representations of the portions of the dataset 12. In other words, the data placement module 120 can be configured to modify the positions of one or more representations of portions of the dataset 12 displayed within the display area 10 of the display 170 in response to movement of the representations of the portions of the dataset 12 based on values in tree spacing structures 14. Although discussed in terms of movement of the representations of the portions of the dataset 12 within the display area 10 (which is considered a static area), in some embodiments, the movement can be described in terms of movement of the display area 10 with respect to the representations of the portions of the dataset 12 (which can be considered a static object).

The representations of the portions of the dataset 12 can include graphical representations of individual portions of the dataset 12 (e.g., node, data elements, data objects) and relationships between portions of the dataset 12. For example, the dataset 12 can include hierarchical data objects represented by shapes that can include alphanumeric characters. The shapes representing the data entities may be linked together by lines, which represent a relationship between the entities. The relationships may be, for example, a child relationship or a parent relationship. The movement of the representations of the portions of the dataset 12, which can include moving the representations of the portions of the dataset 12 in any combination of directions, including horizontal, vertical, diagonal, panning, zooming, etc., can be triggered via an input device 105 of the computing device 100. In some implementations the movement may be a select-and-drag movement, similar to a pan. In some implementations, the movement may be a zoom in, which decreases the quantity of representations in the display area while increasing the size of the representations. In some implementations the movement may be a zoom out, which increases the quantity of representations viewable in the display area by decreasing the size of the representations. In some embodiments, the portions of the dataset 12 that can be represented can be referred to as nodes, data elements, data entities, or as data objects.

For example, representations of data objects of the dataset 12 can be selected for display in the display area 10 of the display 170 by the data placement module 120 at a first time. Movement of the representations of the portions of the dataset 12, such as panning of the representations of the portions of the dataset 12 in a horizontal direction, can be triggered by a user via the input device 105 of the computing device 100 at a second time. The movement of the representations of the portions of the dataset 12 can be received by the data placement module 120, and the data placement module 120 can be configured to redraw the representations of the portions of the dataset 12 displayed within the display area 10 of the display 170 in response to the movement triggered via the input device 105 based on the movement of one of the representations and the tree spacing structure 14. In some implementations, spacing of the representations may also be based on a focus line 15 defined for the display 170. A focus line is a reference line (e.g., a y coordinate or an x coordinate) defined for the display area 10. The positioning of representations of the portions of the dataset 12 is determined based on distance from the reference line and descendants intersecting the focus line. For example, before reaching the focus line representations in a generation may overlap, while representations intersecting the focus line may be evenly spaced. Representations of the portions of the dataset 12 that are past the focus line (e.g., between the focus line and the root) may be spaced (e.g., parallel to the focus line) relative to the descendants on the focus line. Thus, the focus line serves as a reference for relative spacing of the portions of the dataset 12.

One or more spatial relationships between representations of portions of the dataset 12 as displayed within the display area 10 of the display 170 can be modified by the data placement module 120 so that the context of the data can be perceived by a user viewing the data in a more desirable fashion. The context can be maintained even though only portions of the dataset 12 may be viewed within the display area 10 of the display 170. The relationships between various portions of representations of the dataset 12 can be more easily processed by a user without losing context when the spatial relationships between the data is modified in response to movement of the representations of the portions of the dataset 12. For example, if the dataset 12 is hierarchical dataset, children of a node may overlap as they enter the display area 10 and expand and contract in a direction parallel to the focus line (e.g., vertically) with movement orthogonal to the focus line 15. In one example, the representations of the children may expand vertically as they move to the right horizontally and may contract vertically as they move to the left horizontally. In some implementations, expansion may occur vertically as the representations move left horizontally and contract as the representations move right horizontally across the display 170. Thus, the hierarchical data can be viewed without losing the context of the relationships between different levels of the hierarchical dataset even though only a portion of the hierarchical data is being viewed. The size and complexity of the hierarchical dataset may make it impossible to view the entirety of the dataset within the display area 10, even when fully zoomed out. Thus, the data placement module 120 makes it easy to navigate the dataset, as demonstrated by more specific examples related to these concepts described herein. Although illustrated as a vertical focus line in FIG. 1, the focus line can be horizontal or diagonal, and may be positioned anywhere in display area 10. Furthermore, in some implementations, the display area 10 may include two focus lines, e.g., one for controlling display of descendent data and one for controlling display of ancestor data.

In some embodiments, the input device 105 can include various types of input devices such as, for example, a keyboard, a touch screen, one or more buttons, an electrostatic touchpad to control a mouse cursor, a mouse device, etc. The input device 105 can be used by a user to move (e.g., pan, scroll, grab, push) representations of the portions of the dataset 12. Although shown as being included in the computing device 100, the input device 105 can be separate component from the computing device 100.

In some embodiments, the dataset 12 can be included in a table, stored in a spreadsheet, stored in a relational database, and/or so forth. The dataset 12 can include relationships (or representations thereof) between data portions (e.g., nodes) included in the dataset 12. In some embodiments, the dataset 12 can include information (e.g., metadata, characteristics) that can be used by the data representation module 128 to form a representation of the dataset 12 in the display area 10 of the display 170.

As shown in FIG. 1, the data placement module 120 includes a data parser 122. The data parser 122 is configured to preprocess the information in the dataset 12 to generate the tree spacing structure 14. In one implementation, the data parser 122 may be configured to select nodes from the hierarchical dataset 12 to preprocess for display. For example, the data parser 122 may select a root and some of the children of the dataset 12 and generate a tree spacing structure 14. In some implementations, the data parser 122 may preprocess the entire dataset, for example building the tree spacing structure 14 for every descendent generation after the root. However if the dataset 12 is large, such preprocessing may be impractical. Accordingly, the data parser 122 may generate tree spacing structure 14 entries for a specified number of generations (e.g., the root and the root's children, grandchildren, and great-grandchildren), and then add additional nodes later (e.g., as a user interacts with the tree or in the background as the user views the display area 10 without interacting with the tree). For example, as the user navigates the hierarchical dataset, the data parser 122 may load additional data from the dataset 12 and generate additional tree spacing structure 14 entries as needed. Thus, the data parser 122 may be configured to dynamically load the dataset 12 and the tree spacing structure 14 as-needed (e.g., as the user navigates to different parts of the dataset 12). Dynamic loading improves the user experience by providing the portion of the tree visible on the display device sooner. The data parser 122 may then continue to add/update tree spacing structure 14 entries either after triggering an initial display or as the user navigates the tree, bringing other nodes into the display area 10. Thus, the data parser 122 may also be configured to update the tree spacing structure 14 when a node is added or removed from the dataset 12. In some implementations, as a node moves into the display area 10, the data parser 122 may consider it a new node and update the tree spacing structures 14 as needed, as will be discussed in more detail herein.

The data placement module 120 includes a data representation module 128. The data representation module 128 is configured to determine coordinates for a representation (e.g., a virtual representation) of the data for display in the display area 10 of the display 170 and to determine placement of other representations based on the coordinates for a first representation, one or more focus lines, and the tree spacing structures 14. In one implementation, the data representation module 128 may be configured to draw the representations, generating data for display in the display area 10. The data representation module 128 may determine the size of the representations, for example based on a zoom factor. The size of the representations may be tied to the zoom level and may not change absent a change in the zoom factor. In some implementations, the data representation module 128 may include a mapping function that ensures that whenever a child appears in the display area 10, the parent is also displayed, unless the parent has moved too far from the focus line. Thus, for example, with a focus line that runs vertically in display area 10, the parent may not be displayed in display area 10 if the parent's x coordinate is outside the right or left boundaries of the display area 10, but as long as the x coordinate is within the left and right boundaries, the data representation module 128 may change the y coordinate so that the parent is visible.

As shown in FIG. 1, the data placement module 120 includes an input device module 124. The input device module 124 is configured to receive (e.g., retrieve) one or more indicators (e.g., signals) from the input device 105 that can be interpreted as triggering movement of a representation of the dataset 12 defined by, for example, the data representation module 128. In some embodiments, the display area 10 can be a different shape than that shown in FIG.

1, and/or can be included in only a portion of the display 170. Although shown as being included in the computing device 100, the display 170 can be separate component from the computing device 100.

Figure 5:
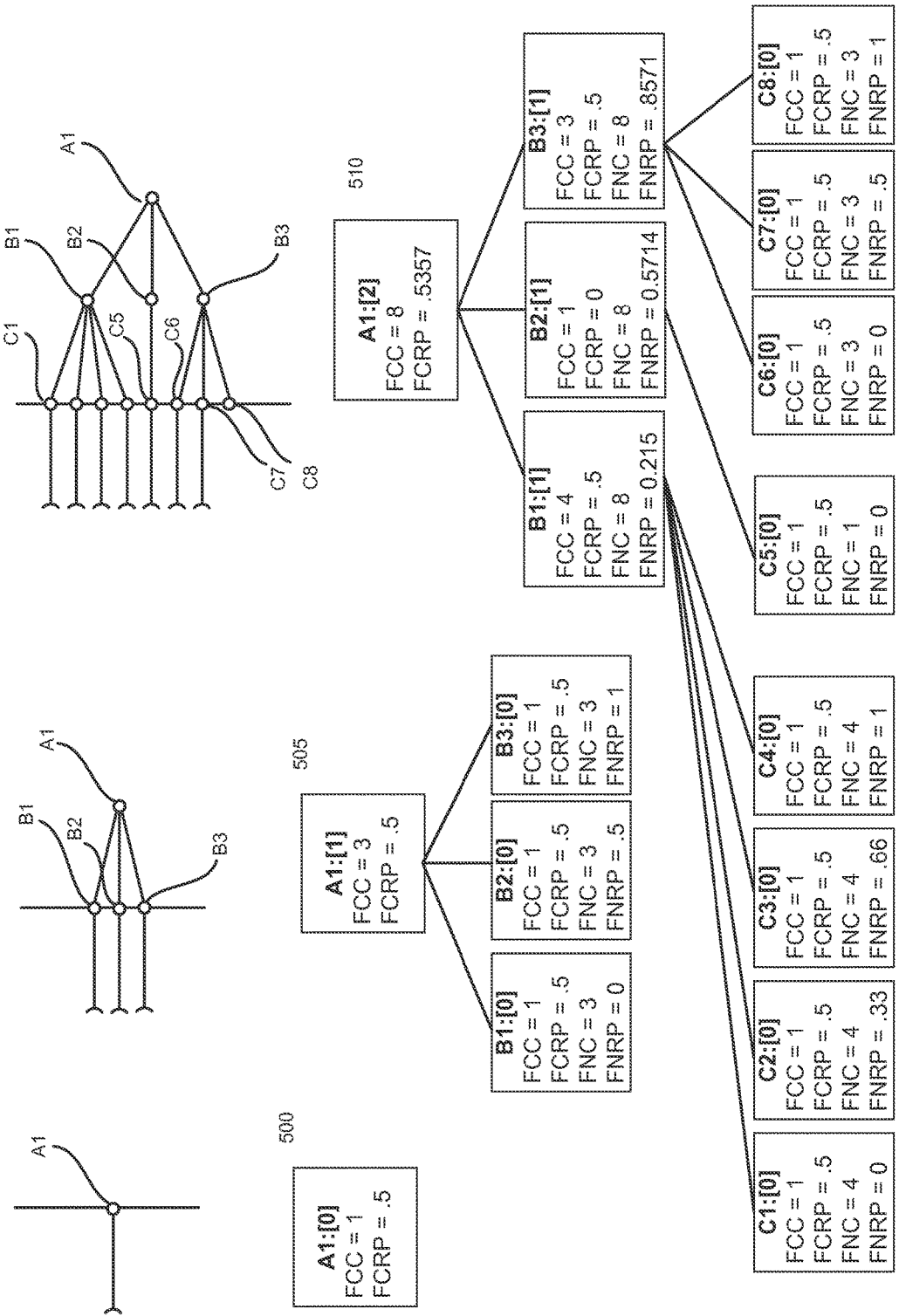
FIG. 5 is a data diagram illustrating an example tree spacing structure, according to an implementation.

In some embodiments, the tree spacing structures 14 can include values for data objects in the dataset 12 that represent spatial relationships based on a focus line. For example, the tree spacing structure 14 may include entries for a specified generation in the dataset 12 and for all ancestors of the generation in the branch of the dataset. The branch may be the entire dataset or a portion of the dataset, dependent on the node selected as the root. In one implementation, the tree spacing structure 14 has a format as illustrated in FIG. 5, which is described in more detail below.

The dynamic hierarchical display system may use a focus line to display (e.g., display on a display device) nodes from a portion of a hierarchical dataset that represents a hierarchy or tree. Nodes on the focus line 15 (in other words, nodes with a representation that intersects the focus line 15) may be evenly spaced along the focus line by a unit of one, as illustrated in FIGS. 2A to 2D. In other words, for a vertical focus line, the nodes are evenly spaced vertically with respect to each other. All of the other nodes in the hierarchy not on the focus line 15 may be positioned based on their relationship to nodes on the focus line. Ancestor nodes of nodes on the focus line 15 may be vertically positioned between their direct first and last child, as illustrated by group 200 in FIG. 2D. In some embodiments, this positioning may be modified by a mapping function so that the positioning is dependent on the children in the display area, as explained herein. Children of focus level nodes are positioned directly behind (i.e., at the same x coordinates for a vertical focus line) the focus level node, as illustrated by group 205 in FIG. 2D. If a node does not have any children, it has empty space that follows it such that the empty area occupies the same space (e.g., same vertical space for a vertical focus line) as a single child, as illustrated by box 210 of FIG. 2D and group 215 of FIG. 2C. If a node on the focus line 15 has many children, the representations of the children may overlap (e.g., may have at least some portions on top of other portions when displayed) so that the many children take up the same space as a single child. FIGS. 2A through 2D illustrate how the same tree or hierarchy is built at each generation.

For example, FIG. 2A illustrates the root or first generation on the focus line. FIG. 2B illustrates the second generation on the focus line 15. FIG. 2C illustrates the third generation on the focus line, and FIG. 2D illustrates the fourth generation on the focus line 15. FIGS. 2C and 2D also illustrate what the hierarchy looks like when a node has no additional children (e.g. group 215 in FIG. 2C and box 210 in FIG. 2D). Although illustrated as a vertical focus line 15, the focus line 15 could also be horizontal or even diagonal. Generally, the focus line 15 runs in a direction orthogonal to the direction of the hierarchy or tree. For example, an employee organizational chart may have a root node at the top and lower levels below the root. In such an example the focus line 15 may be a horizontal focus line. As another example, a family history tree may have an ancestor as a root on the right with descendants to the left of the root. In such an example, the focus line 15 may be a vertical focus line. In addition, the display area 10 may include two focus lines 15. For example, the root of a family history dataset may have descendants to the left and ancestors to the right. In this example, the focus line on the left may be for spacing descendants and the focus line on the left may be used for spacing ancestors.

Figure 3C:
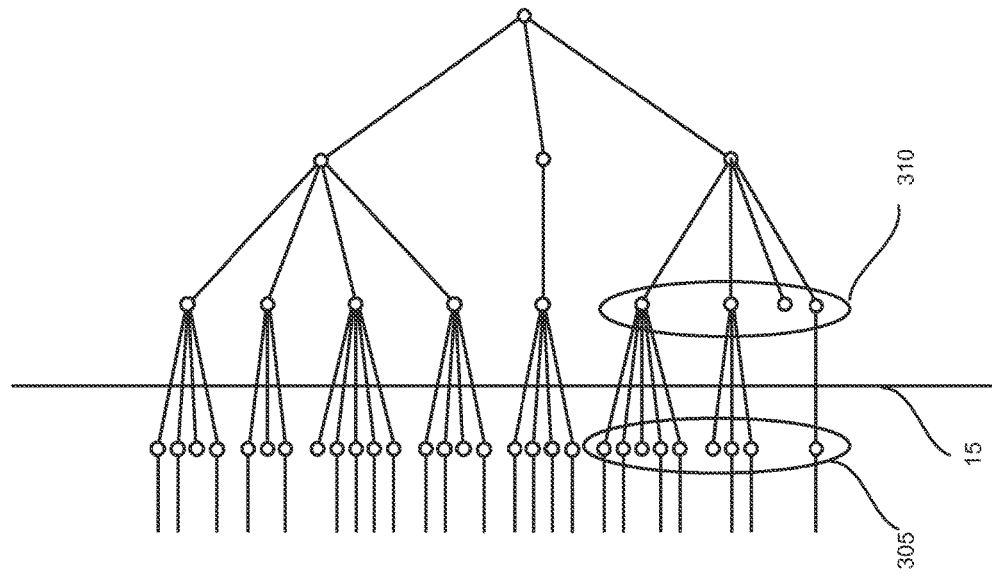
FIGS. 3A to 3C are diagrams that illustrate a representation of spacing of a hierarchical dataset with a focus line between generations, according to an implementation.
Figure 3B:
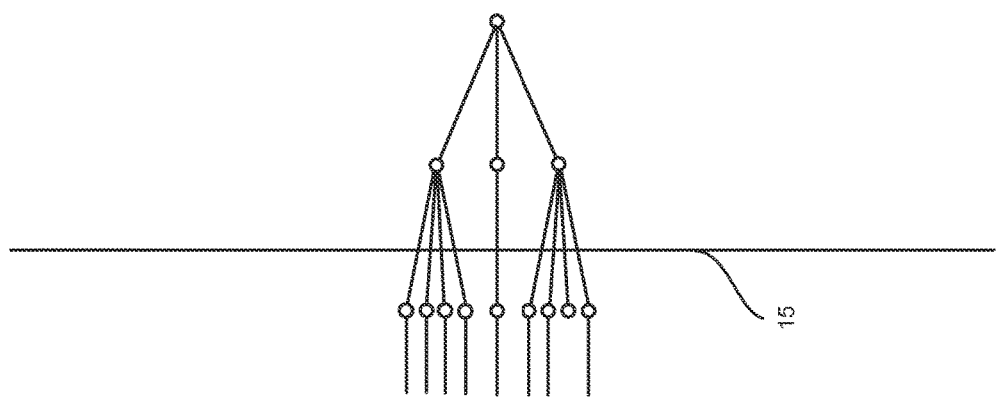
Figure 3A:
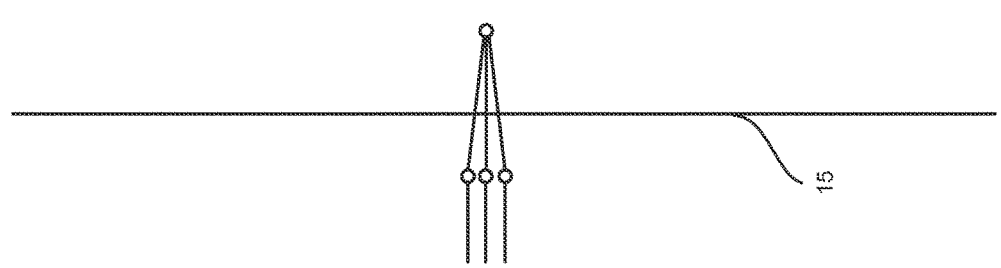

When no generation is on the focus line, the system may draw a combination of two trees built off of the focus line. The two trees are of generations n and n+1. Generation n is the generation that has not yet crossed the focus line 15 and generation n+1 is the generation that has already crossed the focus line 15. FIGS. 3A through 3C show the same tree (hierarchical dataset) as shown in FIGS. 2A through 2D but with the states of the tree being approximately 50% of n and 50% of n+1. In FIG. 3A, the focus line lies between the first generation and the second generation, so the first generation is (n+1) and the second generation is n. In FIG. 3B the focus line 15 falls between the second generation and the third generation, so the second generation is n+1 and the third generation is n. In FIG. 3C the focus line 15 falls between the third generation, which is n+1, and the fourth generation, which is n. FIG. 3C illustrates that none of the generations are evenly spaced by a unit of one nor lie on the focus line, e.g., group 305 and 310.

Tree Spacing Structure

The dynamic hierarchical display system may use a tree spacing structure to determine placement of the various nodes in the display with regard to the focus line. When a root node is initially selected, e.g., either by default when a user starts the data placement module 120 or when the user changes the node to be used as the root, the dynamic hierarchical display system may begin generating tree spacing structures for the nodes. The root node can represent the root node for a branch of the hierarchical dataset. For example, in a family history dataset, the root node may represent a person and the branch may be defined as nodes that descend from the person or nodes that are ancestors of the person in the dataset. Thus, the dataset itself may include many more nodes than the branch represented by the descendants or ancestors of the root node, and the system may calculate tree spacing structure entries only for the nodes in the branch defined by the root node. The system may use the tree spacing structure to enforce the spacing described above without having to calculate the relative spacing for every node in the tree every time the percentage changes. Instead, the system may use the tree spacing structure to calculate the coordinates of every node based on the position of any particular node in the tree, i.e., the branch of the hierarchical dataset represented by the root node, which could be the entire hierarchical dataset depending on the root node selected. Thus, as the user selects a node displayed in the view area to drag, the system can position the nodes around the selected node using the tree spacing structure.

In some implementations, the system may preprocess the tree spacing structures for all nodes in the branch of the hierarchical dataset at an initial time. In some implementations, the system may use dynamic loading of the tree spacing structure, so that an initial number of generations with tree spacing structure entries and additional entries are added when they begin to move into the display or in the background once an initial display is generated. Dynamic loading improves the perceived functioning of the system by resulting in faster display of the representations of the nodes at an initial load time.

The tree spacing structure for each node may include a list of tree spacing structure entries, the list having a maximum length equal to the number of generations of descendants the root node has in the dataset. A node will have an entry in the list for each generation that includes the node. A generation includes the node if the generation does not occur higher in the tree than the generation of the node, e.g., if the generation is not the parent generation of the node or grandparent generation, etc. In other words, the further a particular node is from the root, the smaller the length of the list for the node is. In some implementations, preprocessing may calculate the structure to the maximum length, e.g., for all the nodes at each applicable generation. For larger datasets, such preprocessing using the maximum length may be impractical and the system may preprocess or calculate the tree spacing structure entries for an initial number of generations (e.g., 4 to 8) and may add generations and entries and recalculate the entries as the user navigates the dataset. Each tree spacing structure entry includes a value for each one of the four spacing variables. These four spacing variables include Focus Child Count, Focus Children Relative Percentage, Focus Nibbling Count, and Focus Nibbling Relative Percentage. In explaining the four values, a Nibbling represents the descendants of the node's parent including the node's own descendants and the descendants of the node's siblings.

The Focus Child Count (FCC) variable represents the quantity (number) of descendants a node has at the focus line for the given generation. If the node is in the generation at the focus line, the node has no children on the focus line and the system may default the FCC to 1. This value is never less than one so that space on the focus line is reserved at each generation for the node, even when the descendants of the node do not reach the generation currently on the focus line.

The Focus Children Relative Percentage (FCRP) variable is a percentage representing the node's relative position to its direct descendants on the focus line. If the node is on the focus line, the system may default the FCRP to 0.5. If the node is not on the focus line and the FCC is 1, the FCRP may be zero, indicating the parent's relative position is in-line with the only child/non-existent child.

The Focus Nibbling Count (FNC) variable represents the FCC of the node's parent. If the node is the root, this variable may have a value of null, or may be left off of the entry.

The Focus Nibbling Relative Percentage (FNRP) variable is the percentage representing the node's relative position to the node's parent's direct descendants on the focus. If the node is the root, this variable may have a value of null, or may be left off of the entry.

Figure 4B:
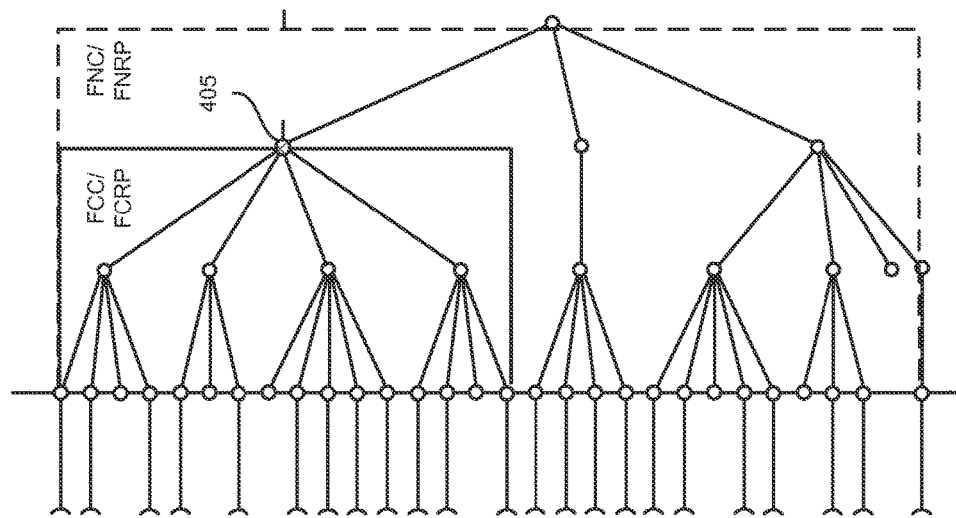
FIGS. 4A and 4B shows a graphical representation of neighborhoods considered for different spacing variables in a tree relation dataset, according to an implementation.
Figure 4A:
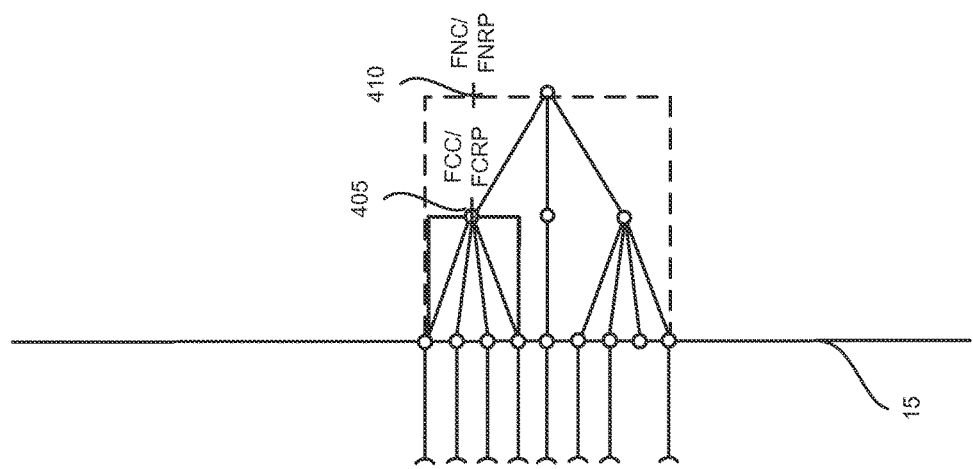

FIGS. 4A and 4B demonstrate nodes included in the calculation of each spacing variable. For example, in FIG. 4A the node 405 is the node for which the system is calculating the spacing variable values. The solid line FCC/FCRP box shows the nodes used to calculate the FCC value and represents the space occupied by node 405's children (or child in some implementations). The dash on the solid line box, the FCRP value, represents the node 405's relative position to its focus level descendants. The dashed FNC/FNRP box in FIG. 4A shows the FNC value that represents the space occupied, along the focus line, of the node 405's niblings (e.g., 405's children, 405's nieces and nephews, and their children). The dash 410 on the dashed line, the FNRP value, represents the node 405's relative position to the focus level niblings. Notice that the dash 410 is a relative position of the node 405 to its parent, based on the number of grandchildren related to the parent. FIG. 4B illustrates how the nodes included in the calculation of each spacing variable changes as the tree moves to a different focus generation. In the example of FIG. 4B, the node 405 now has grandchildren on the focus line, thus the FCC and FNC increase accordingly.

When drawing a tree these values are multiplied by a certain percentage when the tree is between generations to build the correct structure. The percentage may represent the distance away from the focus line of the node that has not yet crossed the focus line. For example a node that is almost ready to reach the focus line may be 95%. This will be explained in further detail herein.

These spacing variable values are stored for each node at each one of its potential generations. FIG. 5 illustrates an example of a tree spacing structure that can be used in some implementations. To calculate the tree spacing structure, the system may traverse the hierarchical dataset through a Breadth-First Traversal.

Figure 6:
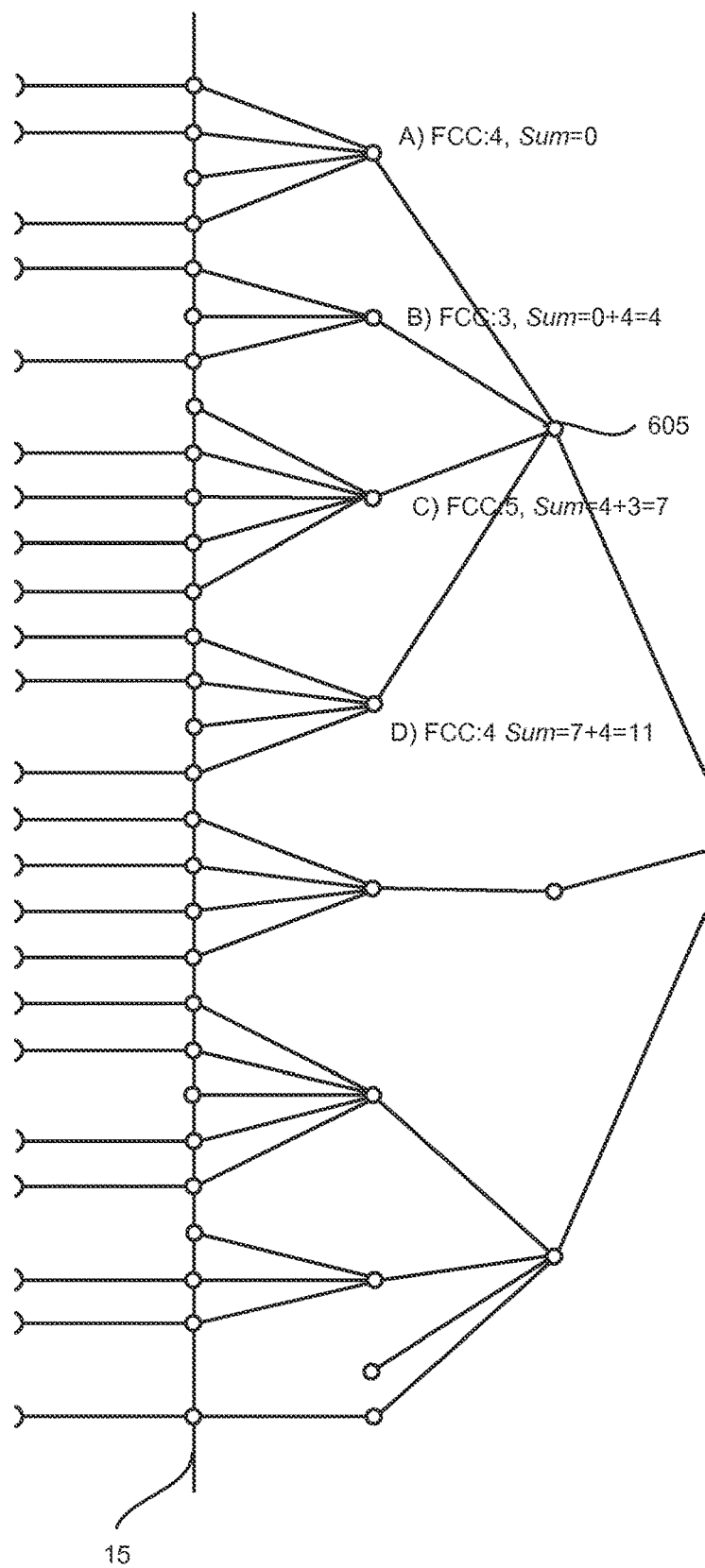
FIG. 6 demonstrates a method for calculating a component of a spacing variable value in a tree spacing structure, according to an implementation.

When a node is on the focus line, the system defaults the FCC and FCRP to 1 and 0.5 respectfully. Thus, as illustrated in FIG. 5, when node A1 is on the focus line (e.g., first entry for A1 in the tree relation structure, or A1 [0]), its corresponding entry in the tree spacing structure has an FCC of 1 and an FCRP of 0.5. Because node A1 has no parent, its FNC and FNRP values are zero or missing, as illustrated in the structure entry for generation 500. If the node has a parent, as nodes B1, B2, and B3 do when generation B is on the focus line (e.g., first entry for B1, B2 and B3 in the tree spacing structure, or B1:[0], B2:[0], etc.), the system calculates the node's FNC and FNRP. The FNC is the sum of the FCC values of all the siblings of the node. If the generation is on the focus line, the FNC will be the number of siblings+1. If the FNC<1 then the system defaults the FNC to 1. Thus, for example, the FNC value for node B3:[0] is 3 because node B3 has two siblings and itself (2+1). Similarly, the FNC value for node C3:[0] is 4. If the node is not on the focus line, the FNC value represents the number of niblings on the focus line, e.g., for B3:[1] this is 8. The FNRP of a node is calculated as (sum+(FCC−1)*FCRP)/max(FNC−1, 1) where sum is the sum of the node's sibling's FCC values that have already been processed. FIG. 6 illustrates an example of how the sum value changes as sibling nodes are processed. For example, for the first node A (e.g., the first child of node 605, the sum is zero. For the second child B, the sum is 4 (e.g., the FCC of node A) and for the third child C, the sum is 7 (FCC of node A plus FCC of node B), etc.

Then system sets the parent's FCC and FCRP values to the average of its first and last children's FNCs and FNRPs respectfully. Thus, for example, the FCC of B3[1] is 3 and its FCRP is 0.5 (average of the FNC and FNRP of C6:[0] and C8:[0]) This is done recursively for each generation. Thus, once a tree spacing structure has been generated at the lowest generation (e.g., the generation on the focus line), the parent's tree spacing structure for that generation (e.g., G+1) can be generated—and when all of the node's siblings have a tree spacing structure entry, the next-higher generation (e.g., G+2) can be calculated, etc.

All these values are stored in a tree spacing structure such that every node stores its FCC, FCRP, FNC, and FNRP values and has a reference to the parent and children, as illustrated in FIG. 5. The tree spacing structure is not limited to any particular structure, so long as the information for each node at its generations can be accessed. For example, the data of FIG. 5 may be stored as an array of FCC values, an array of FCRP values, etc., for each node or as instances of objects, as nodes in a tree, etc. In some implementations, the generation at the focus line may have an array index of 0, the parent an array index of 1, the grandparent an array index of 2, etc. Thus, the parent's entries in the tree spacing structure may be accessed by adding one to the array index of the child, and the parent may access the tree spacing structure of the child by subtracting one from the array index. Of course, linking may also be done via pointers, etc. The tree spacing structure may be stored in non-volatile memory so that it may be used at later times to display portions of the tree.

Figure 7:
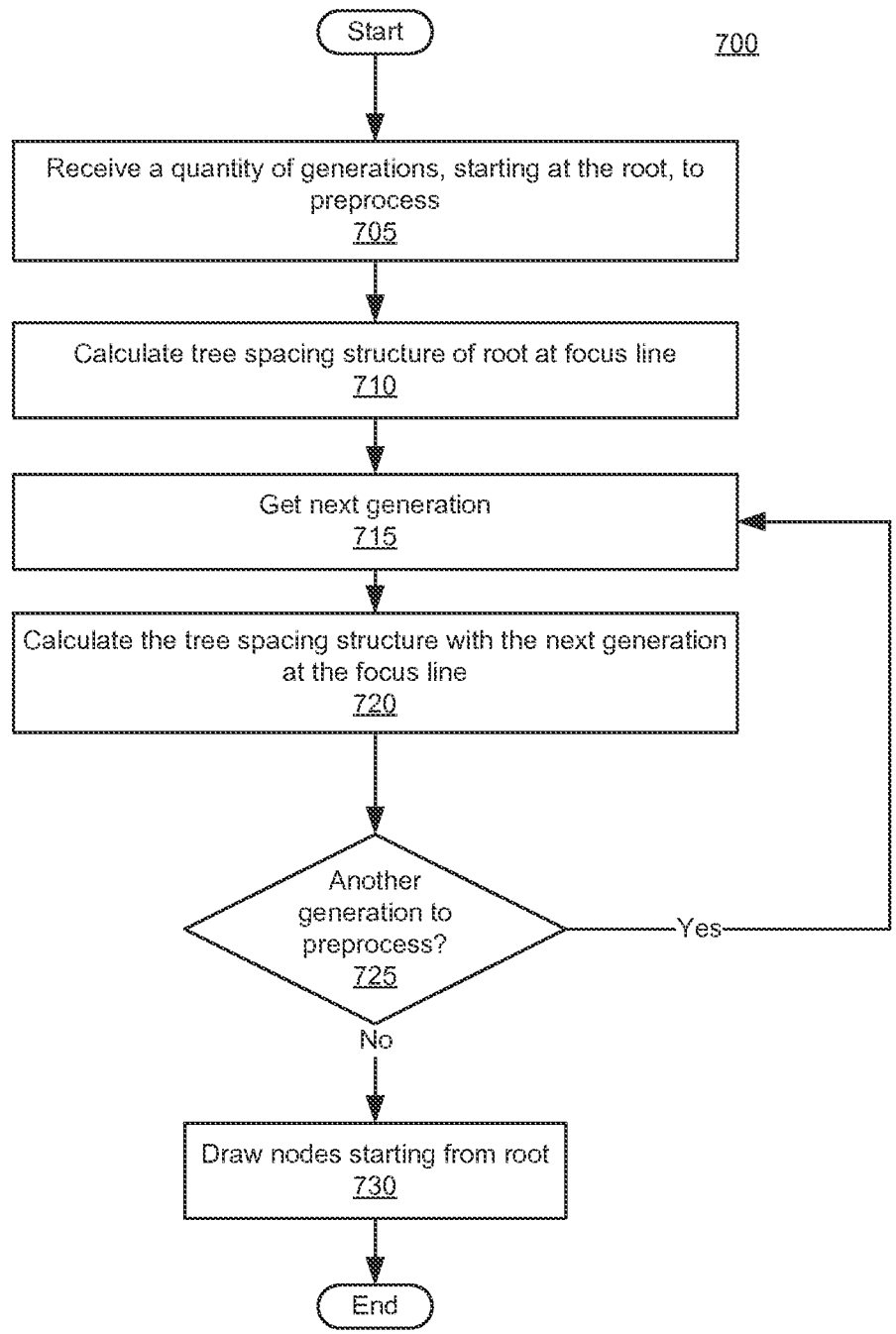
FIG. 7 is a flow diagram illustrating an example process for loading a tree spacing structure for a hierarchical dataset, according to an implementation.

FIG. 7 is an example flowchart of a process 700 for populating a tree spacing structure, in accordance with an implementation. A dynamic hierarchical display system, such as computing device 100, may use process 700 to prepopulate tree spacing structures when a new root node is selected. In some implementations, the root node may have a descendent tree and an ancestor tree and the system may run process 700 twice, once for the descendants and once for the ancestors, generating two tree spacing structure instances for the root node. In some implementations, process 700 may be part of a dynamic loading process, meaning that the system calculates the tree spacing structure for a fixed number of generations from the root node, which is less than all generations. This enables the system to more quickly begin displaying the tree on the display device. Additional generations may be added to the tree spacing structure as needed (e.g., as the user navigates to a node not yet loaded into the tree spacing structure) or in the background as the user views the display without navigating to a node that does not have information loaded. In some implementations, all generations may be loaded via process 700. The process 700 may be an example of the preprocessing described above with regard to FIGS. 4, 5, and 6.

Process 700 starts by receiving the data from the hierarchical dataset that is used to preprocess the tree spacing structure (705). The data may represent a number of generations (e.g., 4 or 8) from the root node. The system may then calculate the tree spacing structure for the root node with the root node at the focus line (710). The root node is considered generation 1 and is similar to generation 500 of FIG. 5. The system may then get the next generation (e.g., the children of the root node) (715). For example, the system may get the children of the current node from the hierarchical dataset, or the children may have been retrieved, e.g., with an initial request to the hierarchical dataset. The system may then calculate the tree spacing structure entries for the next generation, e.g., with the next generation at the focus line (720). This is generation 2 and may look similar to generation 505 of FIG. 5. If there is another generation to preprocess (725, Yes), the system may move to the next generation of nodes (715) and calculate tree spacing structure entries with the next generation at the focus line (720). This may be generation 3 and look similar to generation 510 of FIG. 5. This loop continues until all generations provided for preprocessing have been preprocessed (725, No). Once all generations provided for preprocessing have been processed, the system may begin drawing the tree, e.g., the node representations, starting with the root node as the target node (730), as described with regard to FIG. 10. The initial loading process 700 then ends, although the system may continue to update the tree spacing structures, as discussed with regard to FIG. 10.

Figure 8:
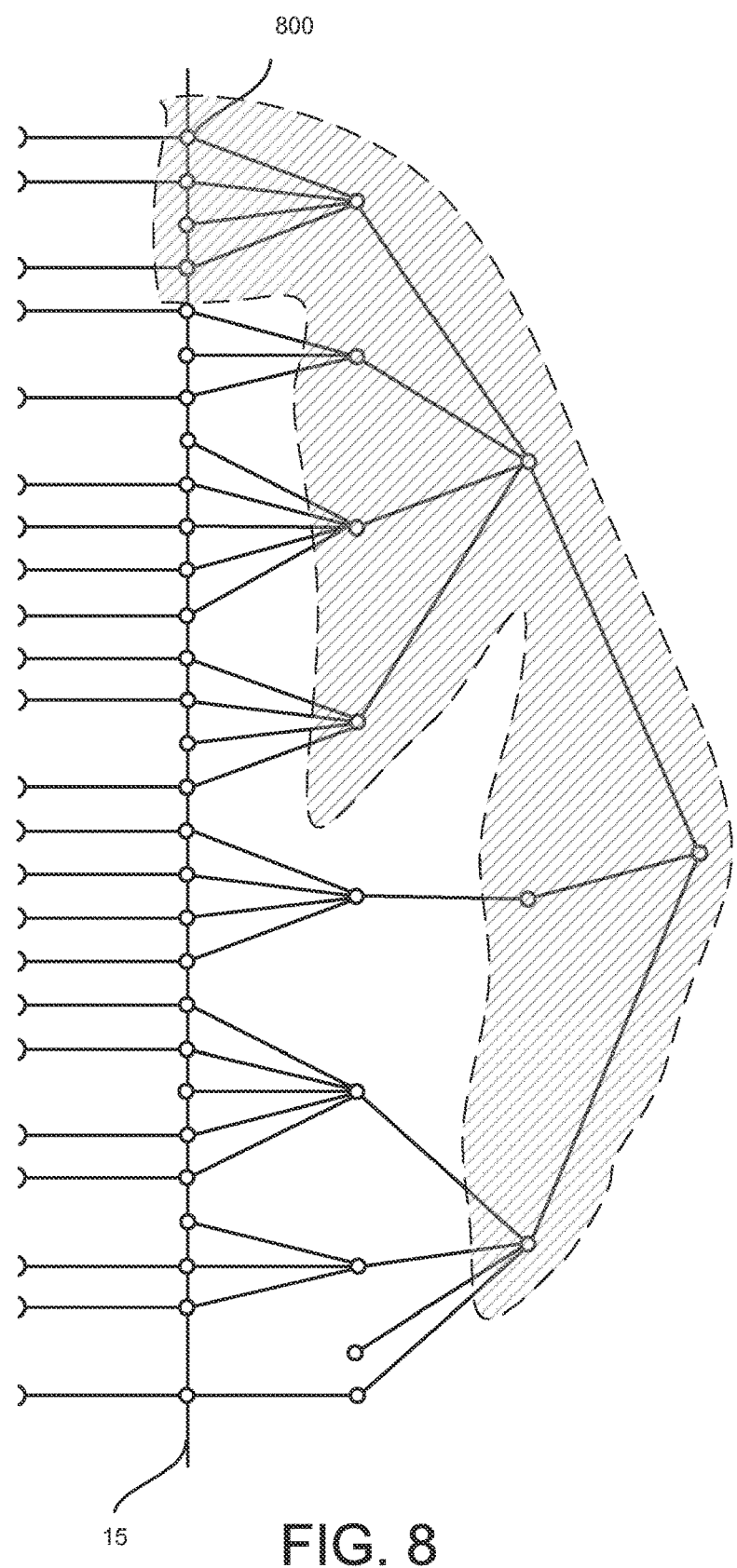
FIG. 8 shows a graphic representation of the nodes in a tree that have corresponding entries in a tree spacing structure recalculated if a labeled node is added or removed, according to an implementation.

After the tree has been preprocessed, e.g., after process 700, if a node is added or removed, then several entries in the tree spacing structure must be recalculated. The nodes that need to have their entries recalculated are all of the added/deleted node's direct ancestors and all of those direct ancestor's immediate children. FIG. 8 illustrates nodes in the tree that would have their entries in the tree spacing structure recalculated if the node labeled 800 was added or removed. Any tree spacing structure generations where node 800 has an entry would need to be recalculated. The system may calculate the entries in the manner described above with regard to the four spacing variables. The recalculations may start with the four (or three, if node 800 is removed) nodes on the focus line, going to the four nodes in the parent generation, etc. until the spacing variables for the root are recalculated. FIG. 8 demonstrates that the tree spacing structure entries for the entire tree do not have to be reprocessed.

Figure 9:
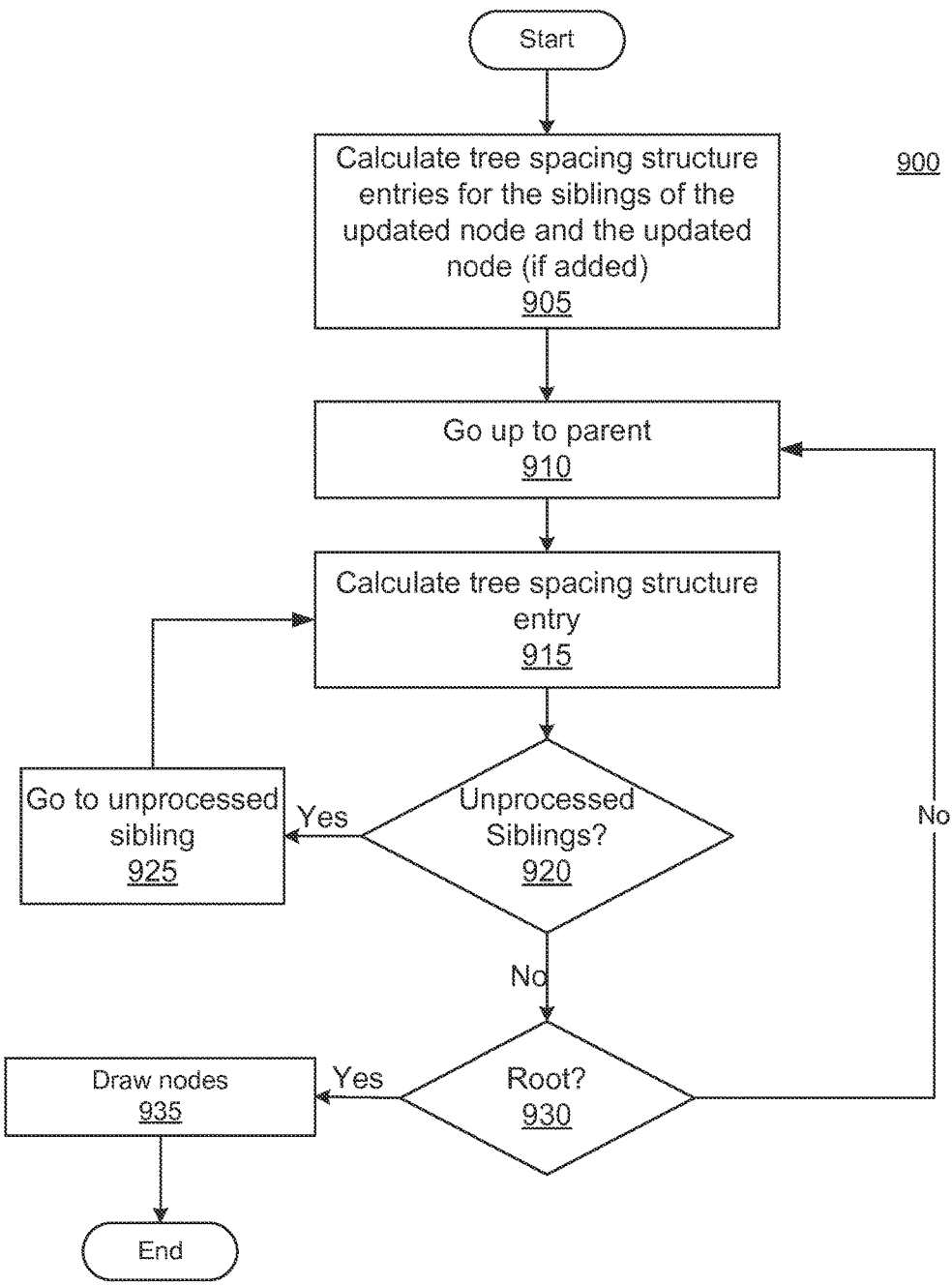
FIG. 9 is a flow diagram illustrating an example process for recalculating entries in a tree spacing structure when a node is added or removed, according to an implementation.

FIG. 9 is a flow diagram illustrating an example process 900 for recalculating entries in a tree spacing structure when a node is added or removed, according to an implementation. In some implementations a node that changes parents is treated as deleted and then added. A dynamic hierarchical display system, such as computing device 100, may also use process 900 to continue dynamically populating tree spacing structure entries after preprocessing the initial generations. For example, when a new root node is selected, the system may perform process 700 to draw an initial representation of the hierarchical data and may use process 900 to continue loading/changing tree spacing structure entries for data that is not initially loaded. In some implementations, the system may not run process 900 until the user begins to scroll and may load additional tree spacing structure entries as nodes are scrolled into the display area, as described with regard to FIG. 10. Thus, process 900 may be part of the dynamic loading process, loading only as much data as is needed to begin displaying the hierarchical data. Nodes not initially displayed may be added to the tree spacing structure entries as their information is loaded from the data store. The system may run process 900 for each tree spacing structure generation in which the added/deleted node has an entry.

Process 900 begins by calculating the tree spacing structure entries of the added node (or deleting the entry if the node is deleted) and re-calculating tree spacing structure entries of the nodes that are siblings of the added/deleted node (905). This is done as described above with regard to the four spacing variables. The system may, as part of this step, add entries for multiple nodes at one time. For example, if none of the siblings of an added node exist in the tree spacing structure, the system may add entries in the tree spacing structure for all siblings as part of step 905. The system may then navigate up to the parent node (910) and recalculate the tree spacing structure entry for the parent (915). If the parent has unprocessed siblings (920, Yes), the system may select the unprocessed sibling (925) and recalculate the tree spacing structure entry for the sibling (915). When all siblings have been processed in this manner (920, No), the system may determine if the root has been reached and recalculated (930). If not (930, No), the system may move to the parent of the siblings just processed (910) and repeat steps 915 to 930. If the root has been reached (930, Yes), the system may trigger display of the tree (e.g., process 1000). Thus, as nodes are loaded the system may update the display even if the user does not interact with the tree in the display. Process 900 then ends.

Displaying the Tree

Figure 10:
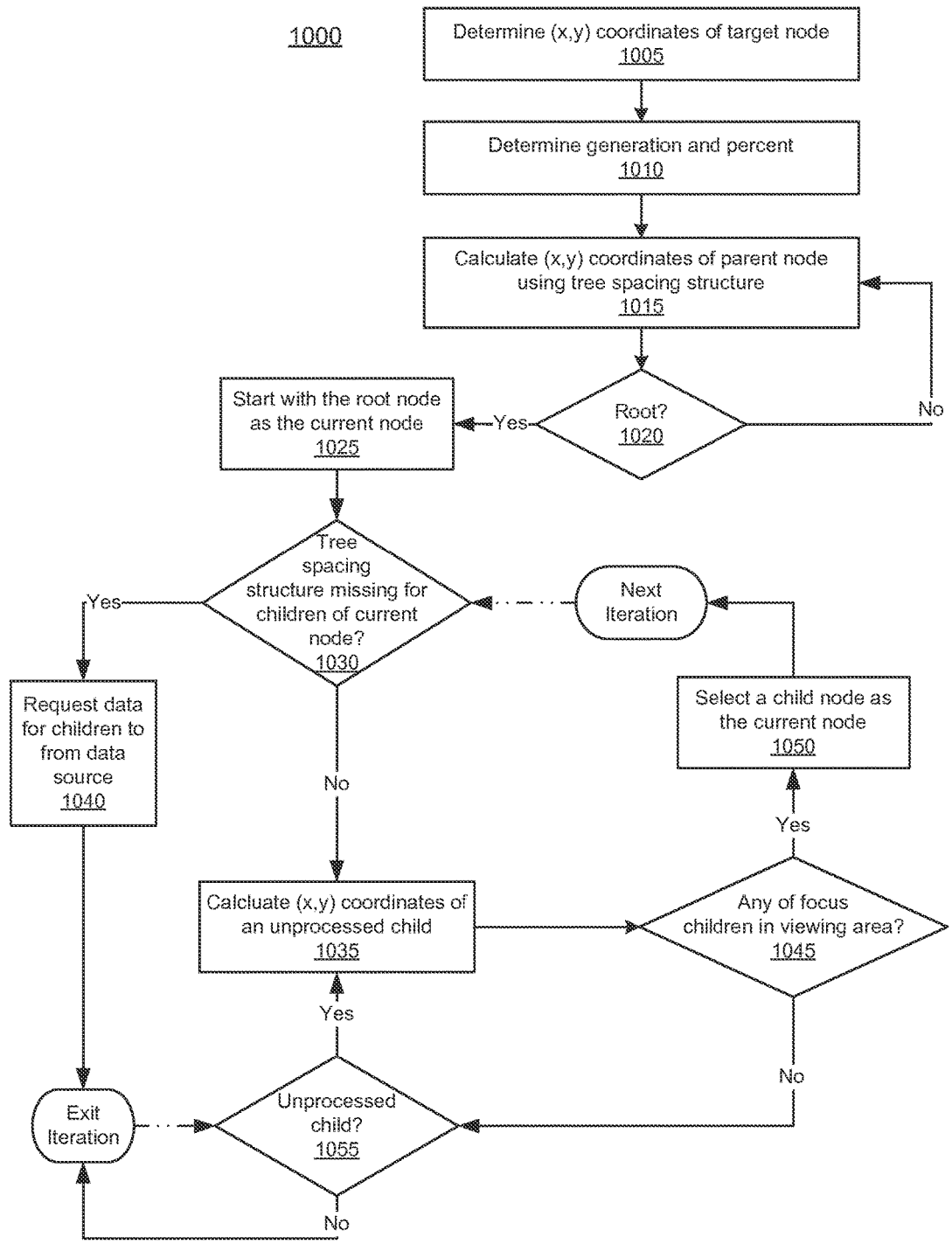
FIG. 10 is a flow diagram illustrating an example process for displaying nodes of a hierarchical dataset using a tree spacing structure, according to an implementation.

With the tree spacing structure entries calculated, the system can display representations of the hierarchical data set based on the position of any node in the tree in a view area. FIG. 10 a flow diagram illustrating an example process 1000 for drawing nodes of a hierarchical dataset using a tree spacing structure, according to an implementation. A dynamic hierarchical display system, such as computing device 100 may use process 1000 to draw representations of the tree in the display area, and to redraw the representations as the user performs select-and-drag operations or as data (e.g. new nodes or newly loaded node information) is added to the tree spacing structure. Process 1000 enables the system to draw the tree in the display area based on the (x,y) coordinates of any node in the tree. For example, process 700 may trigger process 1000 to draw the tree starting from the root, so that the root is selected as the target node. As another example, a user may select an area of the display, for example with a press on a touch screen or a click-and-hold of a mouse button, and drag the tree in any direction. This is a select-and-drag operation and represents user interaction with the tree that may trigger process 1000. The node (e.g., the representation displayed for the node) that is closest to the coordinates of the selection (e.g., the click or press) may be selected as the target node. Adding new nodes to the tree spacing structure via process 900 may also trigger process 1000, for example, so that a placeholder representation is replaced with the data loaded from the data store.

For the purposes of drawing the tree, the (x,y) coordinates and the dimensions of the viewing area may be expressed in terms of the size of the representations used to depict the nodes in the tree. For example, the size of the representations may be fixed at a given zoom level. The size of the viewing area may be expressed in terms of the number of representations that will fit vertically and horizontally across the viewing area when on the focus line. For example, if the focus line is vertical and ten node representations fit in the viewing area when on the focus line (and spaced by a unit of 1), the viewing area may have y coordinates that range from 1 to 10. Similarly, the x coordinate may be defined in terms of the number of representations that fit in across the screen, also spaced by a unit of one (spacing orthogonal to the focus line stays constant between representations, so horizontal spacing between representations is always one unit regardless of how far the representation is from a vertical focus line). If four representations fit across the viewing area then the x coordinate may range from 1 to 4. In some implementations, the focus line may be located at 1 (e.g., y=1 for a vertical focus line). This is considered the focus offset. Expressing the coordinates in terms of the number of representations allows the system to effectively divide the viewing area into generations. Actual screen coordinates may be determined based on the size of the representations and the relative coordinates. In the discussion below, the term coordinates refers to relative coordinates.

The system may determine the coordinates of the target node (1005). If process 1000 is run for an initial time, the (x,y) coordinates may be predetermined or defaulted. For example, the (x,y) coordinates may be centered in the display area, or may be shifted based on the position of the focus line with regard to center. For example, if the focus line is to the left of center, the root node may be placed to the right of center at same offset (e.g., a number of generations) from the focus line. Thus, when a new root is selected the system may always place the new root at particular coordinates in the display area. On the other hand, the system may calculate the coordinates for a target node that is being moved during a select-and-drag operation. The drag direction may represent an x shift and a y shift determined from a starting point and ending point. The starting point can be the selection. To make the drag operation appear smooth, the system may perform process 1000 at regular intervals during an ongoing select-and-drag operation. In this case the starting point may be the coordinates from the previous interval. The shift may be used to calculate the new coordinates of the target node. In other words, the system may shift the target node from its beginning (x,y) coordinates by the change in x and y. Thus, the select-and-drag input has before (e.g., at the select) and after (e.g., end of drag) coordinates.

Figure 11:
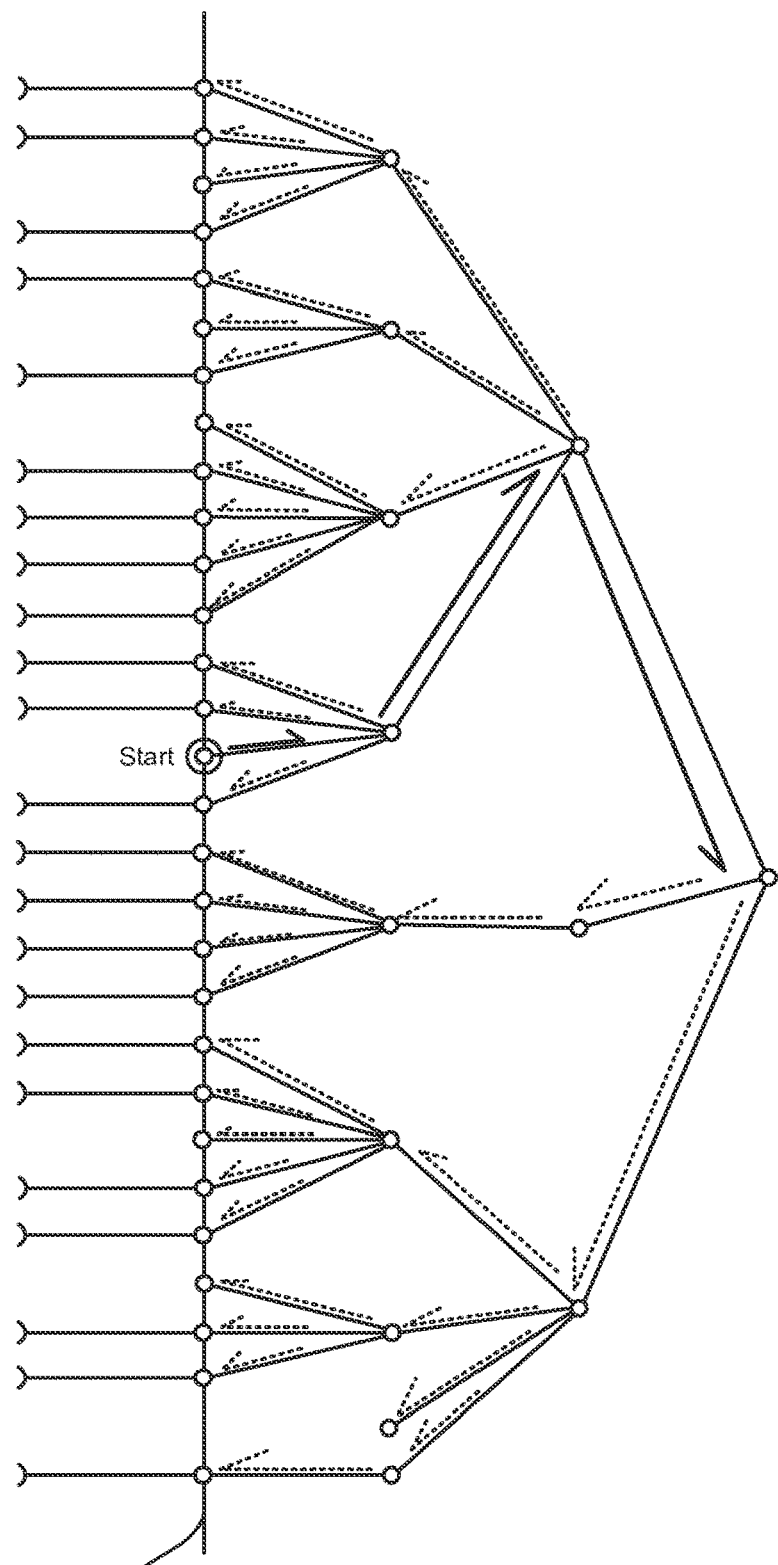
FIG. 11 shows a graphical representation of the order of calculating coordinates for any hierarchical dataset based on the position of a start node in the hierarchical dataset, according to an implementation.

Once the system knows the after (x,y) coordinates of the target node, the system may draw the representation of the target node and draw the rest of the tree relative to this given location. The given location (e.g., the (x,y) coordinates calculated in 1005) are also referred to as the point after. The system can draw the tree properly using the tree spacing structure no matter where the target node falls in the tree. FIG. 11 illustrates a graphical representation of calculating coordinates for any hierarchical dataset based on the position of a start node in the hierarchical dataset, according to an implementation. The target node in FIG. 11 is the node circled and labeled "Start." The target node is placed at an arbitrary coordinate location (e.g., step 1005), for example as part of a select-and-drag. The system recursively uses the percentages in the tree spacing structure to draw all of its direct ancestors in the correct location. For example, the system may draw the "Start" node's parent, grandparent, and great-grand-parent, as illustrated by the thick black arrows in FIG. 11. Then each of these ancestors draws its children, e.g., in an order represented by the dashed arrows in FIG. 11. If said child has descendants that are within the display area (not shown), its children will recursively follow the same procedure. Whether or not the child is in the display area is calculated using the four spacing variables. For example, if the node labeled "Start" in FIG. 11 is at y coordinate 100, the node just above the "Start" node adds one unit (e.g., FCC=1) to 100 to determine its y coordinate. The display area may be defined by a maximum and minimum y coordinate and a maximum and minimum x coordinate. If a node has an x or y coordinate beyond the boundaries. If a node has children within the display area, it may be "drawn" even if the node itself is not within the display area.

Returning to FIG. 10, the system may determine two values from the point after: the Generation (G) and Percent (P) (1010). Because the focus line is typically not located at x=0 (or y=0), the system may use an offset to determine which generation is at the focus line. The x coordinate of the focus line (for a vertical focus line) is the focus offset, (e.g., focusOffset below). The y coordinate of a horizontal focus line represents the focusOffset. In some implementations, the focusOffset may be 1. Of course the offset may also be 0. The system may calculate G as: floor(after.x)−focusOffset, where after.x is the x coordinate (relative) at the end of the select-and-drag input. The relative coordinates may be expressed as decimals. For example, if the user moves the root node from an original x coordinate of 3 to a point after that is half the width of the representation, the x coordinate of the point after may be expressed as 3.5. The floor(after.x) in this example is 3. If the focusOffset is 1, the generation may be 3−1, or 2.

As indicated earlier, the representations (e.g., shapes) that represent the nodes may have a fixed size, which can be based on the zoom percentage. The representations may also be spaced in a direction orthogonal to the focus line (e.g., horizontally) by a fixed amount from each other so that the system can calculate, based on floor(after.x)−focusOffset, which generation (G) would have a representation on or approaching the focus line. (Of course, with a horizontal focus line, the after.y coordinate would be used instead of the after.x). The system may also calculate the percentage (P) as: after.x−floor(after.x). The percentage is used to determine spacing when no representations intersect the focus line, or in other words the focus line falls between representations. In the example above, the percentage would be 3.5−3 or 0.5 (e.g., 50%).

The system may then calculate the (x,y) coordinates of the target node's parent using the tree spacing structure (1015). Spacing of the parent may be determined with mapping or without mapping. To determine the position of the parent without mapping, the system may retrieve the FNC of that child at the generation of G, the FNRP of child at the generation of G, the FCRP of parent at generation G+1. The system may then calculate the relative distance, relativeDistance1, between the parent and child, for example, as (parent.FCRP−child.FNRP)/(child.FNC−1). The system may repeat this operation again but with G+1 instead of G. By doing this the system determines relativeDistance2. The system may then take the sliding percentage of the relativeDistance values as relativeDistance1*(1.0−P)+relativeDistance2*P. The system may then calculate the parent y value as parent.y=node.y+relativeDistance. The node that the system calculates coordinates for is referred to as the processed node.

In some implementations, the system may use mapping rather than the relative distance. The mapping ensures that as long as a parent has a focus child in the display area, the parent also stays in the upper and lower boundaries of the display area (with a vertical focus line). Thus, instead of being statically placed at the midpoint of the space occupied by its children, visible or not, the parent sides up and down relative to the space occupied by visible focus children. FIGS. 12A and 12B illustrate the effects of mapping a parent 1205 to the space 1210 parallel to the focus line occupied by the children in the display area 1215, according to an implementation. FIG. 12A illustrates a parent that is not mapped to the vertical space (e.g., parallel to a vertical focus line) occupied by the children as the tree is dragged vertically (e.g., parallel to the focus line) in the display area. FIG. 12A illustrates that the parent stays centered in the vertical space occupied by its children, and therefore is not visible at times when the vertical space 1210 is less than 25% through the display area 1215 or greater than 75% through the display area 1215. FIG. 12B illustrates a parent mapped to the space occupied by the children using the same vertical drag. In FIG. 12B, the children travel farther from 0% to 100% than the parent does. Specifically, the children move the height of the display area plus the vertical space of all the children, but the parent moves only the height of the display area.

To calculate the (x,y) coordinates of the target node's parent with mapping may use the FCC, FNC, FCRP, and FNRP values from the child. In one implementation, the y coordinate of the parent may be calculated according to $$h * \frac{FNC + \text{child} \cdot y - FCC * (1 - \text{child} \cdot y / h) - (FNC * FNRP - FCC * FCRP)}{FNC + h}$$

where h is the scaled height of the display area (e.g., if 10 node representations fit in the display area, the scaled height is 10, but if 20 node representations fit in the display area, the scaled height is 20). Because (FNC*FNRP−FCC*FCRP) represents the space parallel to the focus line (e.g., vertical space for a vertical focus line) occupied by all the children above the given child, the system can calculate the same value using the sum of the FCC values of the children above the given child.

The system may determine whether the parent is the root (1020). If the parent is not the root (1020, No), the system may move through the generations of the tree toward the root, calculating the (x,y) coordinates of each parent at each generation until reaching the root node (always incrementing the generation as we move to the parent). For example, as illustrated by the solid black lines in FIG. 11, the system may moving through the generations of the tree toward the root, calculating (x,y) coordinates of each parent, until reaching the root node. During this phase, the system knows the location of the child and determines the position of the parent.

Upon reaching the root node (1020, Yes), the system may begin drawing the rest of the children, e.g., those marked by the dotted lines in FIG. 11. The system may start determining coordinates for children, starting with the root node as the current node (1025). The system may determine if the tree spacing structure is missing entries for any of the current node's children (1030). As indicated earlier, the tree spacing structure entries may not exist because of dynamic loading (e.g., where the tree spacing structure grows as the user navigates and new nodes come into the display area). If the children exist but are not yet in the tree spacing structure (1030, No), the system may send a request to the data store for the children and may add tree entry structures for the children (1040), for example using process 900 described with regard to FIG. 9. The process then exits the current iteration because it has reached the end of the branch of the tree it is currently processing. Exiting the iteration causes the process 1000 to go back to the previous current node. If current node is the root, then exiting the iteration causes process 1000 to end, triggering display of the tree based on the calculated coordinates for the nodes. Exiting the iteration when the current node is not the current node will jump back to step 1055, to determine if the current node has unprocessed children.

In some implementations, the system may anchor the target node. In other words, as nodes are added to the tree spacing structure as part of dynamic loading (e.g., the request of step 1040 triggers new entries added to the tree spacing structure), the recalculations could cause the coordinates of the target node to shift (because its position is relative to the nodes being added). The system may therefore anchor the target node with respect to the point after so the anchor node does not scroll as the tree spacing structure changes. This may involve adjusting the coordinates of the direct ancestors of the anchor node.

If the tree spacing structure is not missing entries for children, the system may then calculate the (x,y) coordinates of an unprocessed child (1035). If the system is using mapping (e.g., drawing a child in relation to the parent with mapping), the y coordinate of the child may be calculated according to $$h * \frac{FCC + \text{parent} \cdot y - FNC * (1 - \text{parent} \cdot y / h) - (FNC * FNRP - FCC * FCRP)}{FCC + h}.$$

If the system is not using mapping, the system may calculate the relativeDistance between the current node and child for each of its children. In the example below, the notation node.FCC[G] means the node's FCC value at generation G. The system may calculate relativeDistance1=(node.FCC[G]−1)*(node.FCRP[G]−1)−(child.FNRP[G−1]). The system may then calculate relativeDistance2 in the same manner except with G+1 and G. With these two values, the system may calculate a sliding percentage of the relative distance values (e.g., to account for the focus line being between generations). The system may apply the sliding percentage to calculate the relativeDistance as relativeDistance=relativeDistance1*(1.0−P)+relativeDistance2*P. The system may then calculate the child y value as child.y=node.y−relativeDistance. The node that the system calculates coordinates for is referred to as the processed node.

The system may also determine if any of the focus children for the processed node are in the display area (1045) (e.g., essentially at least one node in the FCC/FCRP box in FIG. 4 would be within the display area for the node for which coordinates were calculated). If any of the children of the processed node have an x coordinate less than or equal to focusOffset−1, the focus children are not in the display area (1045, No).

In some implementations, the system may use the upper and lower bounds of the processed node's focus level children to determine whether the focus children are in the display area. In some implementations, the system may calculate the lower bound, e.g., lowbound1, as the node.y−node.FCRP*(node.FCC−1). The system may calculate the upper bound, e.g., upperbound1, as lowbound1−(node.FCC−1). The system may then calculate lowbound2 and upperbound2 using the same algorithm above but with G+1 instead of G.

The system may use the sliding percentage P to calculate the actual upperbound and lowerbound from the values calculated above. For example, the system may calculate lowerbound=lowerbound1*(1.0−Percent)+lowerbound2*Percent and upperbound=upperbound1*(1.0−Percent)+upperbound2*Percent. If the system determines that the upperbound is greater than equal to the top of the screen (usually 0) and lowerbound is less than the y value that represents the bottom of the screen (1045, Yes) then the algorithm continues because a child is in the display area. For example, the system may select a child node as the processed node and enter a next iteration (e.g., the child recursively performs 1030 to 1050 with its children) decreasing G by 1 for every generation. This algorithm will stop when G is less than −1 (e.g., the generation that has not yet reached the focus line). If no children of the processed node are in the display area (1045, No), the system may stops determining coordinates and may move on to an unprocessed sibling (1055) and no more of the node's children are calculated because they will all be off of the screen.

Thus, the system may determine if the current node has any unprocessed children (1055). If there is an unprocessed child (1055, Yes), the system begins a breadth-first traversal of that branch until the system determines no children are in the viewing area or all coordinates have been determined. When all children for a current node have been processed (1055, No), the system may exit the current iteration. As discussed above, if the current node is the root node (e.g., all nodes have iteratively drawn their children, as applicable), process 1000 will end. If the current node is not the root node, then process 1000 is still iteratively drawing children and will pop out of a current iteration, checking for unprocessed children of the current node in the previous iteration.

The calculations described above can be adjusted depending on desired functionality. Furthermore, the above example has been provided for a vertical focus line and it can be modified to work with a horizontal focus line or even a diagonal focus line.

Figure 13B:
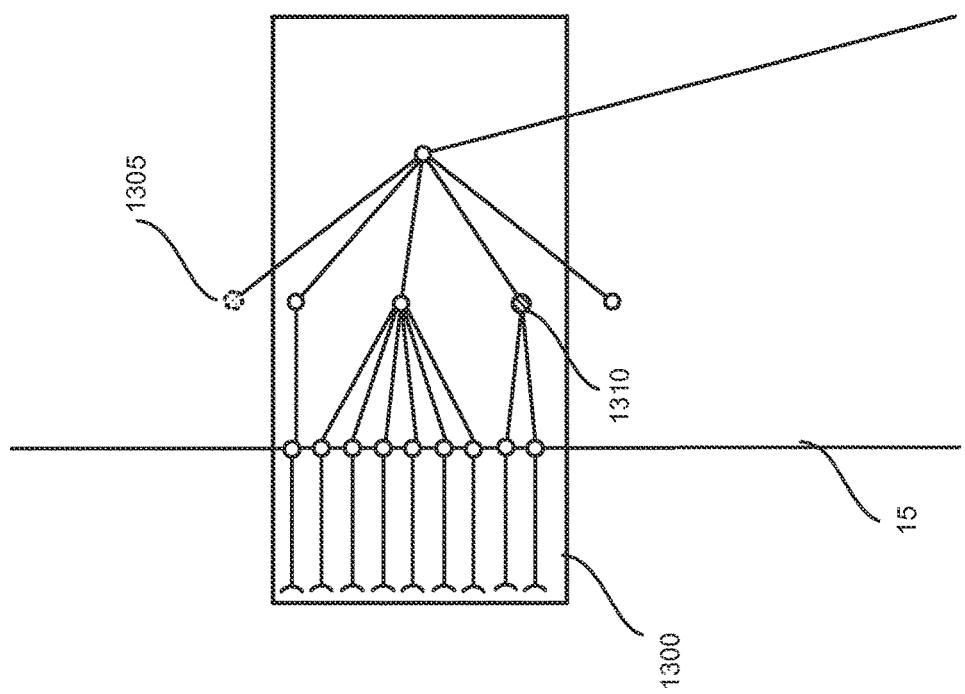
FIGS. 13A and 13B are diagrams that illustrate an example of redrawing the nodes of a hierarchical dataset responsive to a select-and-drag input.
Figure 13A:
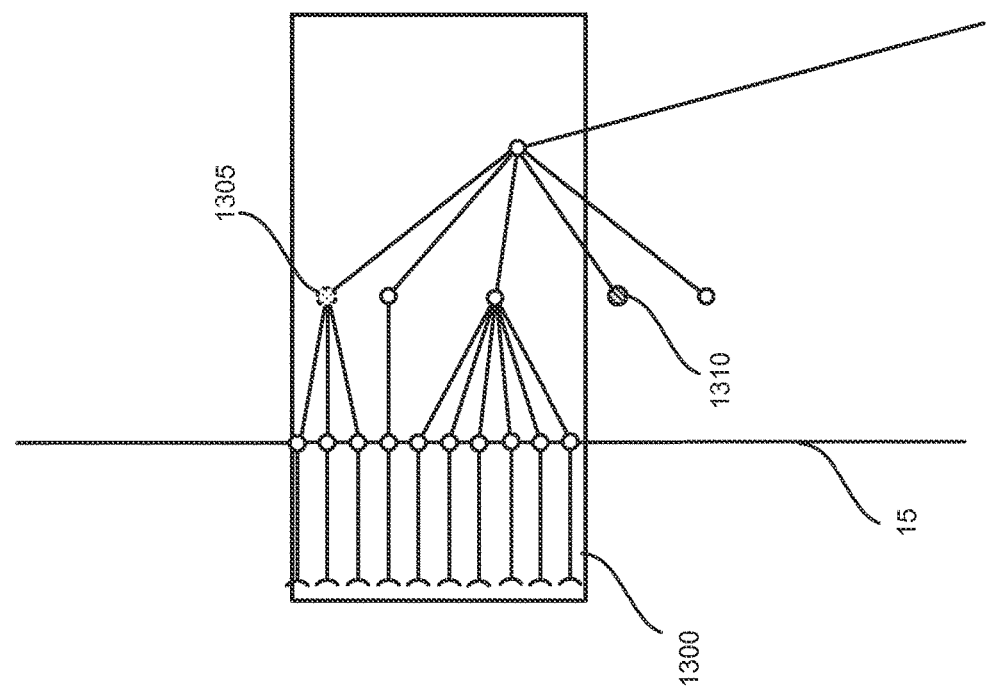

FIGS. 13A, 13B, 14A, and 14B demonstrate the procedure of redrawing the tree responsive to a select-and-drag input. The display area 1300 represents an area visible to a user, for example the upper, lower, left, and right, edges of a display. FIGS. 13A and 13B illustrate what happens as the user moves the tree up. In FIG. 13A, children of node 1305 are in the display area while children of node 1310 are not.

In FIG. 7B, all of the children of node 1305 have moved off the screen, so these nodes no longer need to be displayed and thus they are not drawn. In FIG. 13B the children of node 1310 move into the display area, so they are then drawn.

Figure 14B:
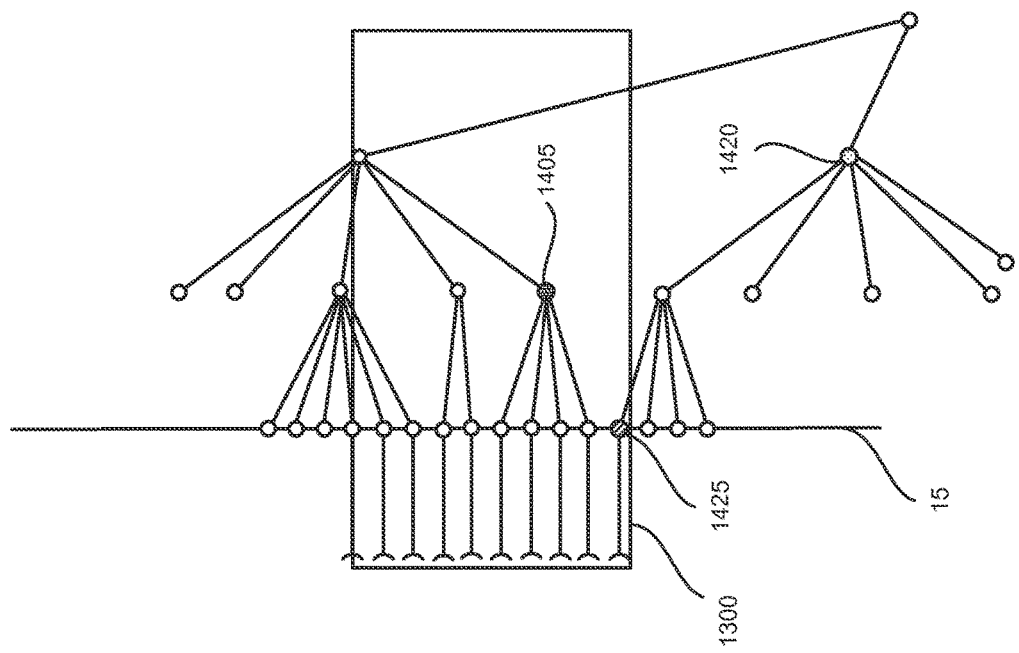
FIGS. 14A and 14B are diagrams that illustrate an example of redrawing the nodes of a hierarchical dataset responsive to a select-and-drag input.
Figure 14A:
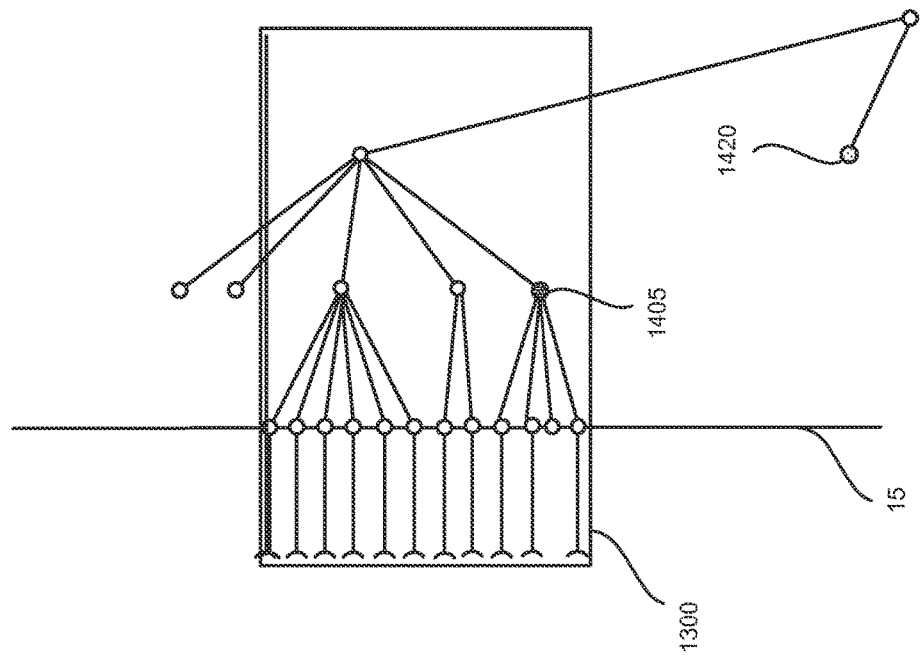

In FIG. 14A some children of node 1405 are in the display area, so they are drawn. Node 1420 has no children in the display area, so no children are drawn. In FIG. 14B, one of the children (a descendent), node 1425, of node 1420 moves into the display area. As a result, the system draws the descendants of node 820 recursively, as needed, to show the yellow node, its descendant. FIGS. 14A and 14B represent parent nodes that are not mapped. The process 1000 described above with regard to FIG. 10 may be an example of the display of the tree described above with regard to FIGS. 13A, 13B, 14A, and 14B.

User Interface

Figure 15:
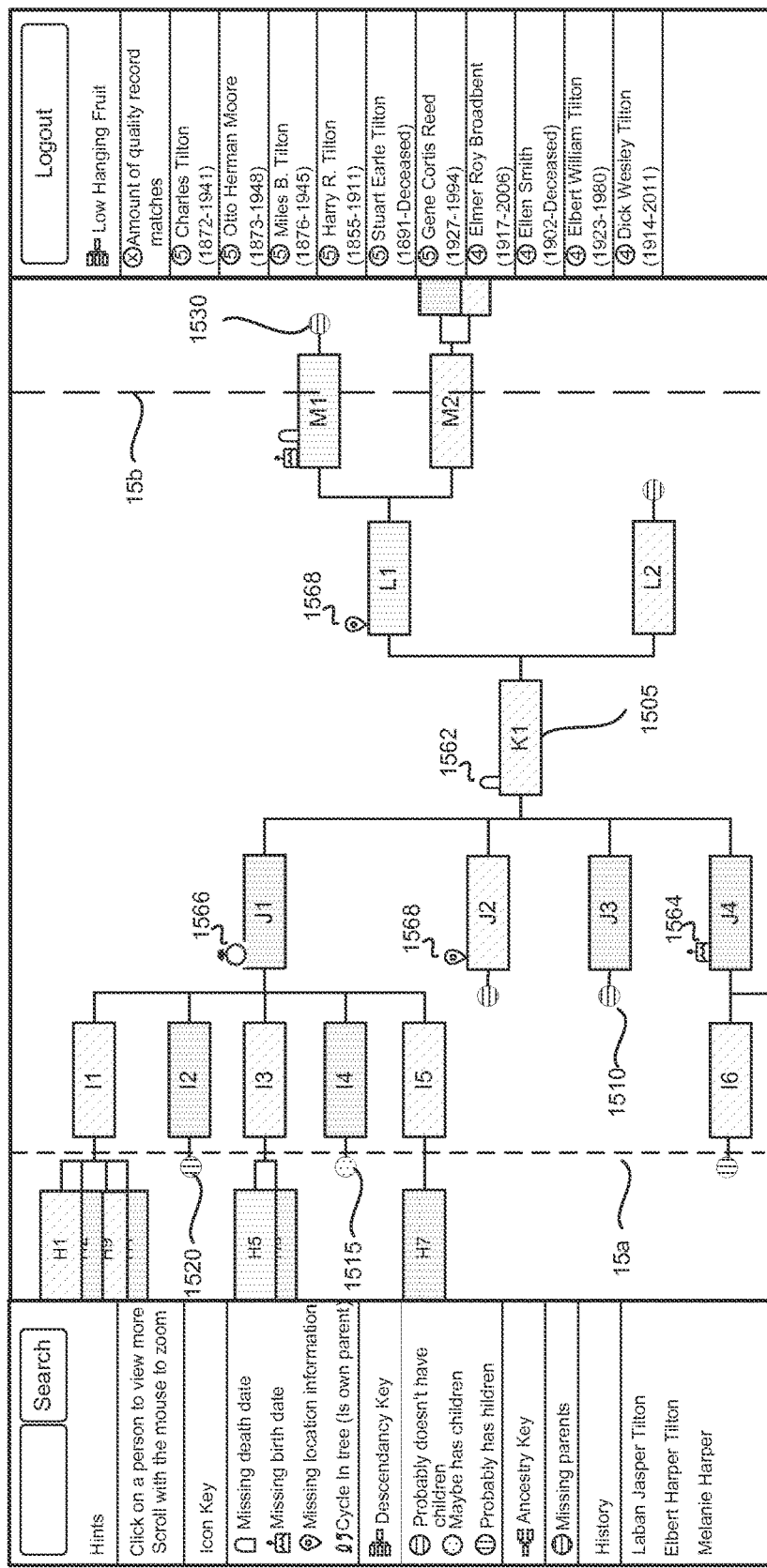
FIG. 15 is an example of a user interface for dynamically displaying family history data, according to an implementation.

FIG. 15 illustrates an example of a user interface for dynamically displaying family history data, according to an implementation. In the example of FIG. 15 the hierarchical dataset represents family history data, although the concepts discussed can be modified to apply to other types of data. In the example user interface 1500, the node 1505 is a root node. The root node is displayed with descendants to the left and ancestors to the right. Thus, the user interface 1500 includes two different trees, each with a tree spacing structure as discussed herein. Focus line 15a is for the descendants and focus line 15b is for the ancestors. In the ancestor tree to the right of the root node 1505, the birth parents represented by nodes L1 and L2 are considered children of root node 1505 for the purposes of the tree spacing structure. Similarly, the nodes that represent the birth parents of the person represented by L1, e.g., nodes M1 and M2, are considered the children of node L1 and the grandchildren of K1 in the tree spacing structure. Also in the example of FIG. 15, a mapping function is applied to the parent nodes, so that the parent does not move out of the upper and lower boundaries of the display area when a child remains within the upper and lower boundaries, as illustrated by node J1, which has other children not in the display area but is not centered with respect to the off-screen children The tree spacing structures are used to determine placement of the representations of the nodes displayed in user interface 1500 as a user navigates the tree. For example, a user may select the root node 1505 by pressing and holding any portion of the representation of the root node 1505, and may drag the representation around the display area. In one example, the display area is a display area of a touchscreen and the user may press a finger on the representation of the node 1505 and slide the finger around the touch screen (e.g., a drag operation). In response, the system may determine coordinates of the representation of node 1505 during the drag use the tree spacing structure to redraw the other node representations. As indicated above, the system may use one tree spacing structure for determining the placement of nodes L1, L2, M1, and M2 based on focus line 15b, and may use another tree spacing structure for determining the placement of nodes H1 to H7, I1-I6, and J1-J4 based on focus line 15a. When a user selects a node (e.g., as part of a select-and-drag operation) in the descendant tree structure, the system may determine placement (coordinates) of nodes in the descendent tree spacing structure first and, when coordinates of the root node 1505 are determined, determine placement of nodes in the ancestor tree. When a user selects a node in the ancestor tree structure, the system may determine placement of the nodes in the ancestor tree, and when coordinates of the root node 1505 are know, begin determining placement of descendent nodes based on the coordinates of the root node. In other words, the user interface 1500 represents an example of the nodes displayed on a display device using a tree spacing structure as discussed herein.

The user interface 1500 may be used to provide additional information to a user. For example, FIG. 15 illustrates how the display of nodes without children may be enhanced to include an indicator regarding the possibility of children existing even though not accounted for in the hierarchical dataset, and the use of node appearance to convey other information about the node, and additional signals or information that can be provided as part of the display. As one example, the shading of the nodes themselves may indicate a property of the node. In the example of user interface 1500, the shading of the nodes indicates the gender of the person the node represents. Thus a user can visually see which nodes are male and which are female. Of course, shading may represent other characteristics, depending on the characteristics represented in the dataset. For example, if the dataset represents connections between computers, peripherals (e.g., printers, scanners, etc.), and other devices in a configuration management data base, the shading may represent offline/online status computers, or the type of device (e.g., one shading for servers, another for printers, another for clients, etc.). As another example, if the dataset represents a directory or file structure, the shading of the node may represent the types of files (e.g. based on file extension) or whether the directory is protected, read-only, etc.

The user interface 1500 may also include information about possible missing items in the dataset. For example, nodes without children may have a missing item icon to show this. The icon can be used as an indicator to represent information regarding the likelihood that the node has children that are not represented in the hierarchical dataset. The indicator may be a different color, a different shape, a different shade, or any visual indication that illustrates a different state. For example, a red or horizontal stripe shape 1510 (e.g., circle, square, etc.) may imply no descendants (for example, the node may represent a child who died as an infant). As another example, a green or vertical stripe shape 1520 may imply that there is a high likelihood of descendants. For example, the node may represent a person who died after child-bearing age and was married, etc.). As another example, yellow or dotted shape 1515 may indicate a good possibility that there are unknown descendants. Because implementations leave a space for a child even when one does not exist, the icon (e.g., 1510, 1515, 1520) can be placed where a child would normally be drawn. For ancestor data, a red or horizontal stripe shape 1530 may indicate that the person has no information on parents. Thus, in a family history dataset, this is an ancestor line that needs more research. Of course, the shapes, colors, and shading are exemplary only and any differing visual factors may be used to differentiate this information. Similarly missing item icons can be used with other types of data. For example, in a configuration management dataset, a workstation without a printer may have an icon to represent the missing printer (e.g., where a printer would normally be expected).

Other missing item icons may appear for the displayed nodes. For example, a person may be missing a death date in the hierarchical dataset, and this missing information may be represented by a headstone icon 1562. Similarly, a missing birth date may be represented by a cake icon 1564, a missing marriage date by a ring icon 1566, and missing location information (e.g., the place associated with the death or birth or marriage) may be represented by a location icon 1568.

In addition to missing item icons, the user interface 1500 may include an information window 1540 that provides information regarding known sources that may help a user find the missing information. This window 1540 may be referred to as the low hanging fruit interface. For example, using characteristics about the parent node for which there is likely missing information (e.g., nodes J1 and M1, for example, but not node I6 in FIG. 15), the system may look in repositories of information, such as digitized census data, military records, birth and death certificates, etc., that match the parent node information. If any such data is found, the number of sources and confidence in the match may be illustrated in window 1540. The low hanging fruit window thus enables a user to select a particular line to research to find additional information to update the underlying hierarchical dataset and add the missing information.

The user interface 1500 may also include a key 1560. The key 1560 includes information that helps the user determine the meaning of the shading, shapes, and missing item icons. The key may also include a history of the selected root nodes, and tips for helping a user find additional information and to scroll or zoom in or out. Zooming changes the size of the representations, and other constants related to the size of the representations, which allows more nodes to fit within the display area, but does not affect the values of the spacing variables in the tree spacing structures. Thus, zooming (in or out) may cause the system to redraw the current tree using a different width/height for the representations but does not require recalculating the tree spacing structures (unless tree spacing structure entries are added because the node is coming in the display for the first time).

Figure 16:
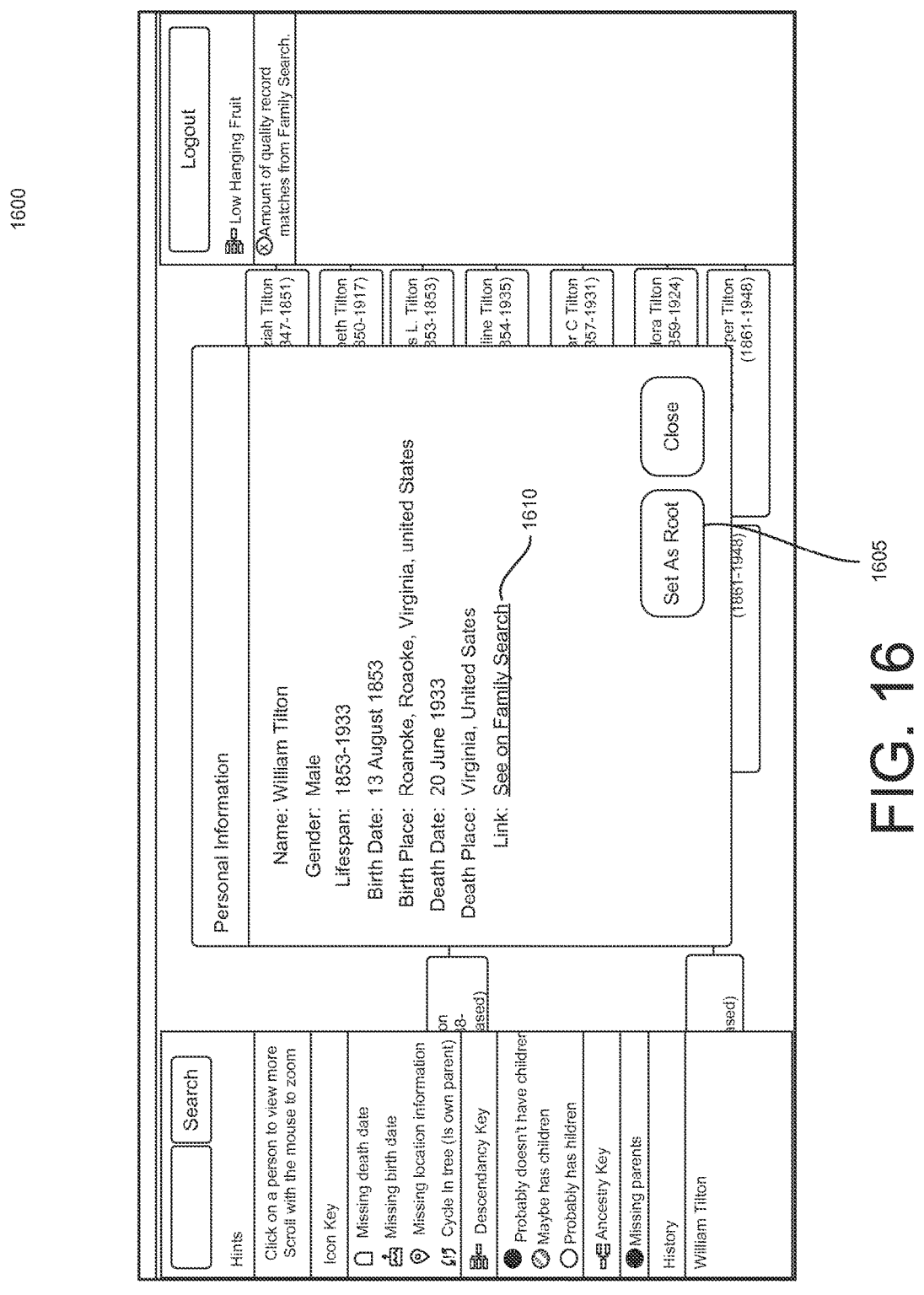

FIG. 16 is an example of a user interface 1600 for changing the displayed root of a hierarchical dataset, according to an implementation. The system may display user interface 1600 when a user selects a node in user interface 1500, for example by double clicking the node. As illustrated in FIG. 16, the user interface 1600 may display more information about the particular node. The system may access this information from the hierarchical dataset or another dataset that stores details for the nodes. The user interface 1600 may include a control 1605 that enables the user to set the root node to the selected node. Setting the root node to the selected node will cause the system to discard the current tree spacing structures, and to begin building new tree spacing structures with the selected node as the root. Thus, after selecting control 1605, the system may redraw the underlying user interface 1500, starting with the new root. In some implementations, the new root may be added to the history in the key 1560. In addition to control 1605, the user interface 1600 may include a link 1610 that enables the user to navigate to another system to view the hierarchical dataset, using the selected node as a starting place in the other system.

While the examples herein have focused on family history data, the techniques apply to any hierarchical dataset. For example, the system may display a file or directory structure on a computer system. Because the user can navigate easily around the entire structure, the user does not need to click on expand/contract icons to open up subfolders. Instead, the children (e.g., the subfolders) and their contents simply scroll onto the display area as the user moves around the hierarchy. This has the advantage of not requiring the user to click several levels of expand/contract icons to see the lowest levels of data. Going up the tree is easy because the children fold themselves as the user navigates toward the rood (e.g., generations not yet at the focus line take up the space of one child). Similarly, the system may display a computer network architecture, e.g. a configuration management system. The same advantages (e.g., being able to scroll and navigate around a large hierarchical dataset without having to click to expand/contract branches) applies to these examples and others.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

According to one aspect, a system for displaying a hierarchical dataset includes a display device having a display area, the display area including a focus line and an upper bound and a lower bound orthogonal to the focus line, at least one processor, and memory. The memory stores a tree spacing structure for a branch in the hierarchical dataset, the branch having a root node and the tree spacing structure configured to include, for each node in the branch, an entry for each generation that includes the node, the entry specifying spacing of the node in a direction parallel to the focus line based on a quantity of descendants intersecting the focus line. The memory also stores instructions that, when executed by the at least one processor, cause the system to perform operations. The operations may include determining first coordinates on the display area for the root node, determining a generation for a descendant of the root node intersecting or approaching the focus line, determine second coordinates of at least some of the descendants in the display area using the tree spacing structure and the first coordinates of the root node, and trigger displaying, on the display device, a representation of the root node and representations of the at least some of the descendants in the display area using the first coordinates and the second coordinates.

Implementations may include one or more of the following features. For example, the entry for the tree spacing structure includes four spacing variables, two relating to descendant representations intersecting the focus line and two relating to parent descendant representations intersecting the focus line. As another example, the quantity of descendants intersecting the focus line may always be at least one. As another example, representations of children of a node with a representation intersecting the focus line may be overlapped so that the representations occupy approximately the space of a single child. As another example, the representation of a node with no children includes a missing item icon that indicates a likelihood that a child exists but is not included in the hierarchical dataset. As another example, the representation of a node that is missing a data item in the hierarchical dataset may include a missing item icon that provides a visual representation of a type of the data item.

As another example, the operations may also include determining a target node for a select-and-drag operation, calculating new coordinates for the target node based on the select-and-drag operation determining third coordinates for direct ancestors of the target node using the tree spacing structure and the new coordinates for the target node, starting with the root, recursively determining fourth coordinates of children with a descendent in the display area based on the tree spacing structure, and displaying representations of the nodes in the display area using the new coordinates, the third coordinates, and the fourth coordinates. In some implementations, the focus line is a vertical focus line and parent nodes with an x coordinate within the display area are mapped relative to vertical space occupied by their children in the display area. In some implementations, recursively determining coordinates may include adding entries to the tree spacing structure as a node enter the display area for a first time and recalculate entries for ancestor nodes of the node entering the display area, as well as siblings of the ancestor nodes.

As another example, the tree spacing structure may be a first tree spacing structure and the focus line is a first focus line and the branch is a first branch in the hierarchical dataset that the hierarchical dataset in a first direction from the root node and the display further includes a second focus line and the memory may also store a second tree spacing structure for a second branch in the hierarchical dataset, the second branch traversing the hierarchical dataset in a second direction from the root node. In such implementations, the memory may also store instructions that, when executed by the at least one processor, cause the system to further perform operations including determining a second generation for descendants of the root node in the second branch that have representations intersecting or approaching the second focus line, determining third coordinates of at least some of the descendants in the second branch that are in the display area using the second tree spacing structure and the first coordinates of the root node, and triggering displaying representations of the descendants in the second branch in the display area using the third coordinates.

In another aspect, a method of dynamically displaying representations of nodes in a hierarchy can include determining a target node for a select-and-drag operation, calculating first coordinates for the target node based on the select-and-drag operation, and determining second coordinates for direct ancestors of the target node up to a root node for the hierarchy using a tree spacing structure, the tree spacing structure configured to include, for each node in the hierarchy, an entry for each generation of the hierarchy that includes the node, the entry specifying spacing of the node in a direction parallel to a focus line with regard to space occupied by a child of the node. The method may also include starting with a root, recursively determining third coordinates of a child with a descendent in a display area of a display based on the tree spacing structure and triggering displaying on the display representations of the nodes having the first coordinates, the second coordinates, or the third coordinates in the display area.

Implementations may include one or more of the following features. For example, the method may also include determining a node in the hierarchy is approaching the display area, adding an entry in the tree spacing structure for the node, and re-calculating entries in the tree spacing structure for direct ancestors of the node and entries for siblings of the direct ancestors. In some implementations, the method may further include anchoring the coordinates of the target node so that re-calculating the entries does not change the first coordinates.

As another example, the method may include adding a missing item icon to a representation of a node with no children in the display area. As another example, the hierarchy may represent files and directories or the hierarchy may represent family history data. In some implementations, the method may also include receiving a selection of one of the nodes in the display area as a new root, deleting the tree spacing structure, and generating a new tree spacing structure based on hierarchical data that includes the new root, wherein the nodes in the hierarchy are based on a branch of a hierarchical dataset that has the selected node as the root of the branch. As another example, the method may also include decreasing dimensions of the representations in response to a zoom out operation and displaying representations of nodes in the display area using coordinates determined based on the tree spacing structure and the decreased dimensions, wherein the decreased dimensions enable more representations to appear in the display area without recalculating the entire tree spacing structure. As another example, the focus line may be a horizontal focus line a parent node with a y coordinate within the display area is mapped to horizontal space occupied by is children in the display area. As another example, the method may also include, as part of recursively determining the third coordinates, determining whether a node has a descendent in the display area based on a focus child count spacing variable and a focus child relative percentage spacing variable in the tree spacing structure and coordinates for a parent of the node.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system for displaying a hierarchical dataset, the system comprising:
 a display device having a display area, the display area including a focus line and an upper bound and a lower bound orthogonal to the focus line;
 at least one processor; and
 memory storing:
  a tree spacing structure for a branch in the hierarchical dataset, the branch ascending or descending from a root node and the tree spacing structure configured to include, for each node in the branch, an entry for each generation that includes the node, the entry specifying spacing of the node in a direction parallel to the focus line based on a quantity of descendants intersecting the focus line, wherein the entry for the tree spacing structure includes respective focus child count, focus children relative percentage, focus nibbling count, and focus nibbling relative percentage variables,
  instructions that, when executed by the at least one processor, cause the system to perform operations including:
   determining first coordinates on the display area for the root node,
   determining a generation for a descendant of the root node intersecting or approaching the focus line,
   determine second coordinates of at least some of the descendants in the display area using the tree spacing structure and the first coordinates of the root node, and
   trigger displaying, on the display device, a representation of the root node and representations of the at least some of the descendants in the display area using the first coordinates and the second coordinates.

2. The system of claim 1, wherein the quantity of descendants intersecting the focus line is at least one.

3. The system of claim 1, where representations of children of a node with a representation intersecting the focus line are overlapped so that the representations occupy the space of a single child.

4. The system of claim 1, the memory further including instructions that, when executed by the at least one processor, cause the system to perform further operations including:
 determining a target node for a select-and-drag operation;
 calculating new coordinates for the target node based on the select-and-drag operation;
 determining third coordinates for direct ancestors of the target node using the tree spacing structure and the new coordinates for the target node;
 starting with the root, recursively determining fourth coordinates of children with a descendent in the display area based on the tree spacing structure; and
 displaying representations of the nodes in the display area using the new coordinates, the third coordinates, and the fourth coordinates.

5. The system of claim 4, wherein the focus line is a vertical focus line and parent nodes with an x coordinate within the display area are mapped relative to vertical space occupied by their children in the display area.

6. The system of claim 4, wherein recursively determining coordinates includes:
 adding entries to the tree spacing structure as a node enter the display area for a first time; and
 recalculating entries for ancestor nodes of the node entering the display area, as well as siblings of the ancestor nodes.

7. The system of claim 1, wherein the representation of a node with no children includes a missing item icon that indicates a likelihood that a child exists but is not included in the hierarchical dataset.

8. The system of claim 1, wherein a representation of a node that is missing a data item in the hierarchical dataset includes a missing item icon that provides a visual representation of a type of the data item.

9. The system of claim 1, wherein the tree spacing structure is a first tree spacing structure and the focus line is a first focus line and the branch is a first branch in the hierarchical dataset that the hierarchical dataset in a first direction from the root node and the display further includes a second focus line and the memory further stores:
 a second tree spacing structure for a second branch in the hierarchical dataset, the second branch traversing the hierarchical dataset in a second direction from the root node; and
 instructions that, when executed by the at least one processor, cause the system to further perform operations including:
  determining a second generation for descendants of the root node in the second branch that have representations intersecting or approaching the second focus line,
  determining third coordinates of at least some of the descendants in the second branch that are in the display area using the second tree spacing structure and the first coordinates of the root node, and
  triggering displaying representations of the descendants in the second branch in the display area using the third coordinates.

10. A method of dynamically displaying representations of nodes in a hierarchy, the method comprising:
 determining a target node for a select-and-drag operation;
 calculating first coordinates for the target node based on the select-and-drag operation;
 determining second coordinates for direct ancestors of the target node up to a root node for the hierarchy using a tree spacing structure, the tree spacing structure configured to include, for each node in the hierarchy, an entry for each generation of the hierarchy that includes the node, the entry specifying spacing of the node in a direction parallel to a focus line with regard to space occupied by a child of the node, wherein the entry for the tree spacing structure includes respective focus child count, focus children relative percentage, focus nibbling count, and focus nibbling relative percentage variables;
 starting with a root, recursively determining third coordinates of a child with a descendent in a display area of a display based on the tree spacing structure; and
 triggering displaying on the display representations of the nodes having the first coordinates, the second coordinates, or the third coordinates in the display area.

11. The method of claim 10, further comprising:
 determining a node in the hierarchy is approaching the display area;
 adding an entry in the tree spacing structure for the node; and
 re-calculating entries in the tree spacing structure for direct ancestors of the node and entries for siblings of the direct ancestors.

12. The method of claim 11, further comprising:
 anchoring the coordinates of the target node so that re-calculating the entries does not change the first coordinates.

13. The method of claim 10, further comprising:
 adding a missing item icon to a representation of a node with no children in the display area.

14. The method of claim 10, wherein the hierarchy represents files and directories.

15. The method of claim 10, wherein the hierarchy represents family history data.

16. The method of claim 10, further comprising:
 receiving a selection of one of the nodes in the display area as a new root;
 deleting the tree spacing structure; and
 generating a new tree spacing structure based on hierarchical data that includes the new root,
 wherein the nodes in the hierarchy are based on a branch of a hierarchical dataset that has the selected node as the root of the branch.

17. The method of claim 10, further comprising:
 decreasing dimensions of the representations in response to a zoom out operation; and
 displaying representations of nodes in the display area using coordinates determined based on the tree spacing structure and the decreased dimensions, wherein the decreased dimensions enable more representations to appear in the display area without recalculating the entire tree spacing structure.

18. The method of claim 10, wherein the focus line is a horizontal focus line and a parent node with a y coordinate within the display area is mapped to horizontal space occupied by its children in the display area.

19. The method of claim 10, further comprising, as part of recursively determining the third coordinates:
 determining whether a node has a descendent in the display area based on a focus child count spacing variable and a focus child relative percentage spacing variable in the tree spacing structure and coordinates for a parent of the node.

* * * * *

UNITED STATES PATENT AND TRADEMARK OFFICE
CERTIFICATE OF CORRECTION

PATENT NO. : 10,176,605 B2
APPLICATION NO. : 14/669725
DATED : January 8, 2019
INVENTOR(S) : Wigington et al.

Page 1 of 1

It is certified that error appears in the above-identified patent and that said Letters Patent is hereby corrected as shown below:

On the Title Page

Item (54) and in the Specification, Column 1, Line 1, delete "HEIRARCHAL" and insert
-- HIERARCHAL --, therefor.

Signed and Sealed this
Ninth Day of April, 2019

Andrei Iancu
*Director of the United States Patent and Trademark Office*